US011389930B2

(12) United States Patent
Iwata et al.

(10) Patent No.: US 11,389,930 B2
(45) Date of Patent: Jul. 19, 2022

(54) SURFACE TREATMENT PROCESSING METHOD AND SURFACE TREATMENT PROCESSING DEVICE

(71) Applicant: SINTOKOGIO, LTD., Nagoya (JP)

(72) Inventors: Kyoichi Iwata, Toyokawa (JP); Takuya Koyama, Toyokawa (JP); Yuji Kobayashi, Toyokawa (JP); Akinori Matsui, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 39 days.

(21) Appl. No.: 16/495,492

(22) PCT Filed: Apr. 13, 2018

(86) PCT No.: PCT/JP2018/015554
§ 371 (c)(1),
(2) Date: Sep. 19, 2019

(87) PCT Pub. No.: WO2018/211879
PCT Pub. Date: Nov. 22, 2018

(65) Prior Publication Data
US 2020/0055164 A1    Feb. 20, 2020

(30) Foreign Application Priority Data

May 16, 2017  (JP) .............................. JP2017-097497

(51) Int. Cl.
*B24C 1/10*     (2006.01)
*G01B 21/30*    (2006.01)

(52) U.S. Cl.
CPC ................ *B24C 1/10* (2013.01); *G01B 21/30* (2013.01)

(58) Field of Classification Search
CPC . B24C 1/10; G01B 21/30; Y02P 90/02; Y02P 90/80; G01L 1/25; G05B 2219/32182; G05B 19/41875
See application file for complete search history.

(56) References Cited

U.S. PATENT DOCUMENTS 9,056,386 B2 *  6/2015  Kobayashi ............... C21D 7/06
9,721,044 B2 *  8/2017  Bewlay ................... G06F 30/00
(Continued)

FOREIGN PATENT DOCUMENTS

CN       101093205 A    12/2007
CN       101552130 A    10/2009
(Continued)

OTHER PUBLICATIONS

Communication pursuant to Article 94(3) EPC dated Jan. 17, 2022 in European Patent Application No. 18802904.5.
(Continued)

*Primary Examiner* — Ryan J. Walters
(74) *Attorney, Agent, or Firm* — Faegre Drinker Biddle & Reath LLP

(57) ABSTRACT

A surface treatment processing method includes: a shot processing step of performing shot processing of shooting shot media at a treatment target; a first inspection step of nondestructively inspecting at least one of a surface side state and an external dimension of the treatment target subjected to the shot processing, evaluating that the treatment target is passed when an inspection result is within a first normal range set in advance, evaluating that the treatment target is failed when the inspection result is out of a first allowable range set in advance to include the first normal range, and evaluating that the treatment target is to be additionally processed when the inspection result is out of the first normal range but within the first allowable range; and an additional processing step of performing the shot
(Continued)

processing again on the treatment target which is evaluated to be additionally processed.

7 Claims, 10 Drawing Sheets

(56) References Cited

U.S. PATENT DOCUMENTS

| | | | |
|---|---|---|---|
| 10,048,227 B2* | 8/2018 | Makino | G01N 27/9046 |
| 11,045,922 B2* | 6/2021 | Iwata | G01B 7/345 |
| 2012/0180539 A1* | 7/2012 | Kobayashi | B24C 1/086 |
| | | | 72/17.3 |
| 2014/0336806 A1* | 11/2014 | Bewlay | G01B 21/04 |
| | | | 700/98 |
| 2017/0008149 A1 | 1/2017 | Kobayashi et al. | |
| 2017/0108470 A1* | 4/2017 | Makino | G01N 27/9046 |

FOREIGN PATENT DOCUMENTS

| | | |
|---|---|---|
| CN | 101560587 A | 10/2009 |
| CN | 101722228 A | 6/2010 |
| CN | 102574273 A | 7/2012 |
| CN | 102985223 A | 3/2013 |
| CN | 105127862 A | 12/2015 |
| CN | 105345672 A | 2/2016 |
| EP | 3 124 964 A1 | 2/2017 |
| EP | 3388196 A1 | 10/2018 |
| JP | H05-279816 A | 10/1993 |
| JP | H05-322870 A | 12/1993 |
| JP | 2003-127065 A | 5/2003 |
| JP | 2006-086323 A | 3/2006 |
| JP | 2014-232246 A | 12/2014 |
| JP | 2015-521956 A | 8/2015 |
| JP | 2015-182171 A | 10/2015 |
| JP | 2016-519312 A | 6/2016 |
| WO | WO-2011/040243 A1 | 4/2011 |
| WO | WO-2012/164757 A1 | 12/2012 |
| WO | WO-2013/145348 A1 | 10/2013 |
| WO | WO 2014/002917 A2 | 1/2014 |
| WO | WO-2014/182886 A1 | 11/2014 |
| WO | WO-2015/125340 A1 | 8/2015 |
| WO | WO-2015145833 A1 * 10/2015 ......... G01N 27/9006 |
| WO | WO 2017/199959 A1 | 11/2017 |

OTHER PUBLICATIONS

International Preliminary Report on Patentability (IPRP) dated Nov. 28, 2019 that issued in WO Patent Application No. PCT/JP2018/015554.

* cited by examiner

Fig.3
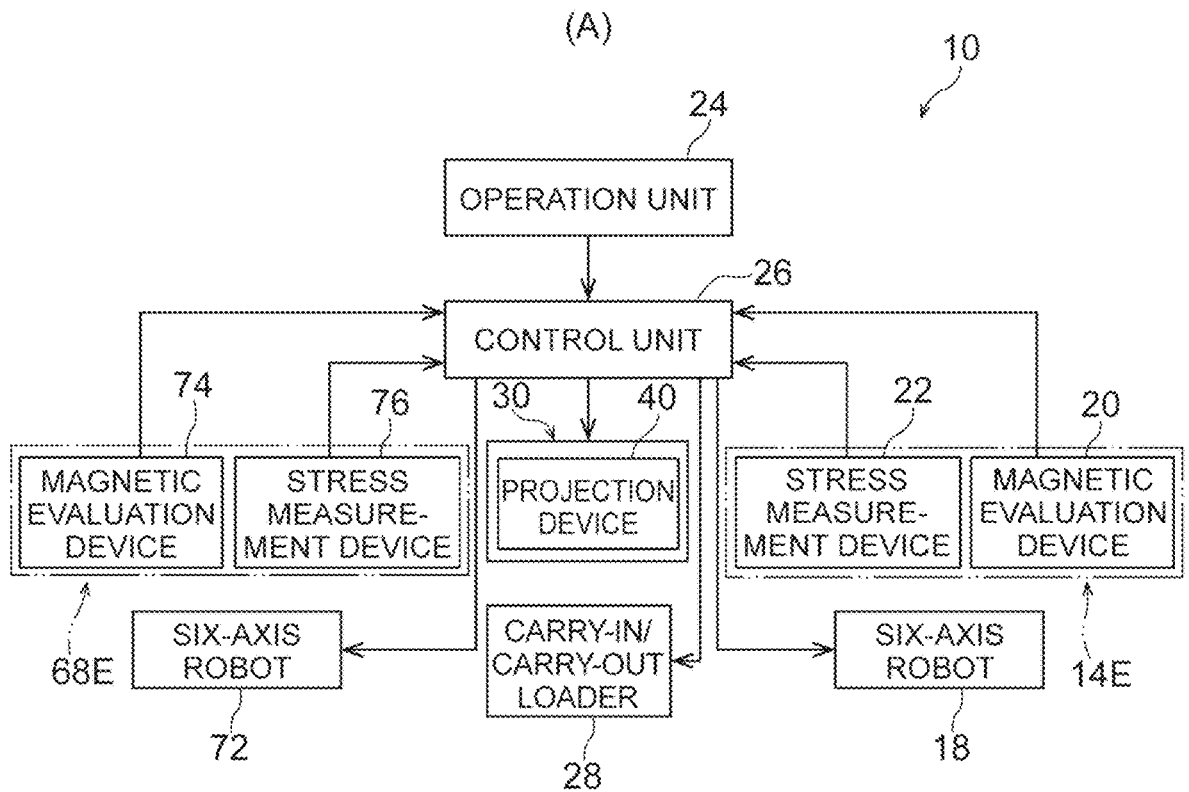
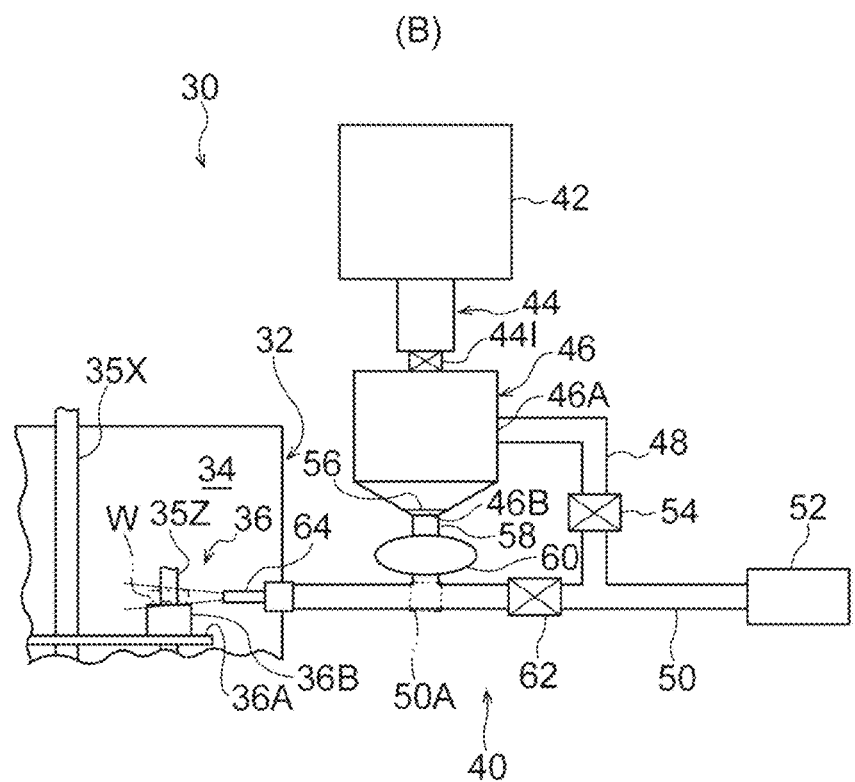

Fig.4 (A)
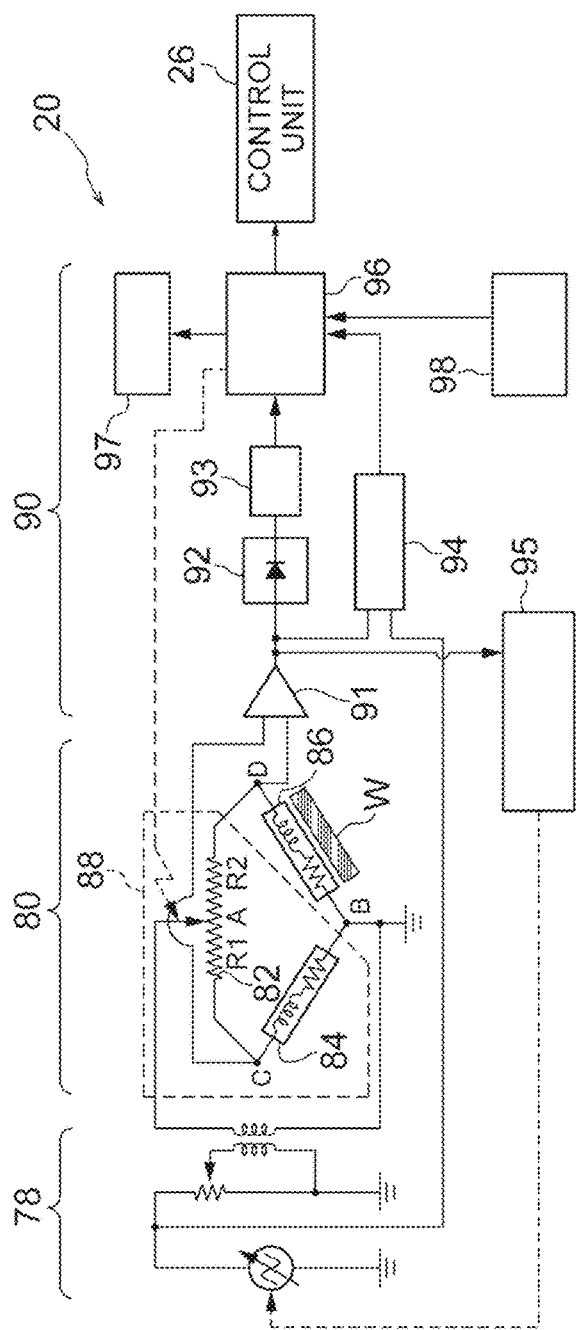
(B)
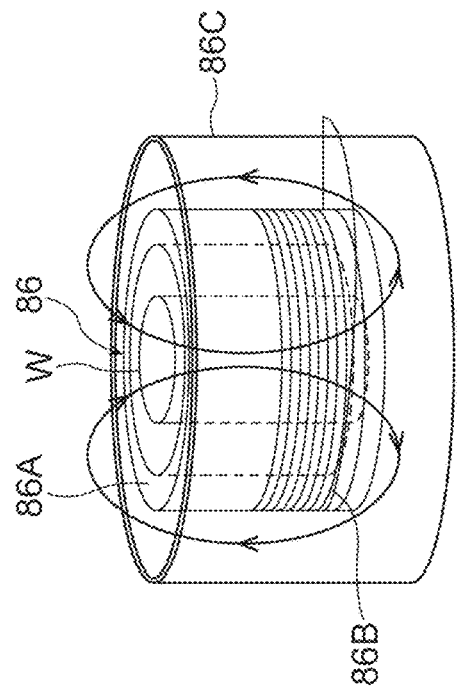

Fig.9
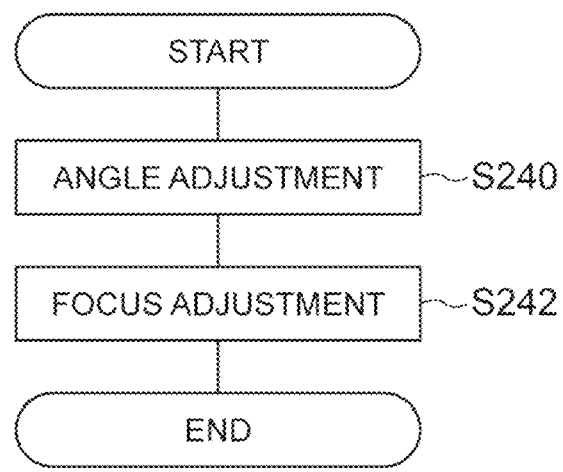
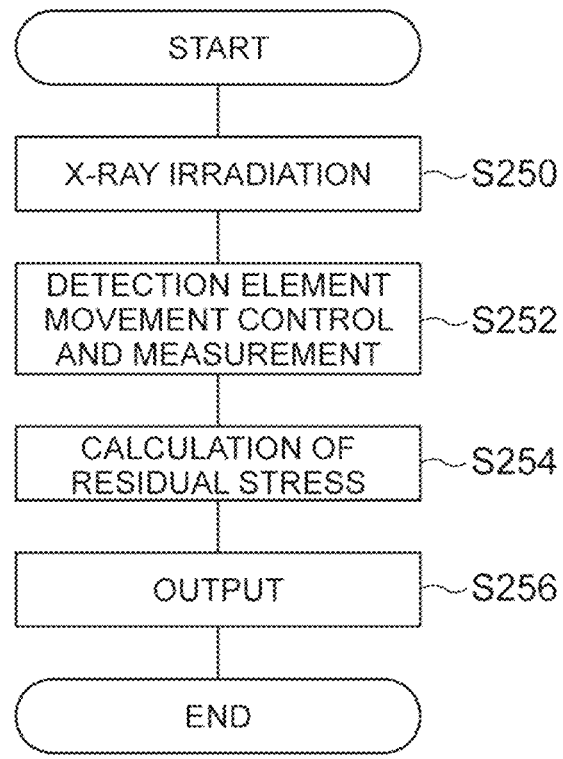

US 11,389,930 B2

SURFACE TREATMENT PROCESSING METHOD AND SURFACE TREATMENT PROCESSING DEVICE

TECHNICAL FIELD

An aspect of the disclosure relates to a surface treatment processing method and a surface treatment processing device.

BACKGROUND ART

As surface treatment processing, processing by shot processing (hereinafter, simply referred to as "shot processing") such as shot peening processing (see Patent Literature 1 below) and shot blasting processing is known. The shot processing is to process a treatment target by shooting shot media at the treatment target. When the treatment target is processed in this way, a device operation management of monitoring an operation state of a shot processing device or a product management of measuring a surface side state and the like of a treatment target subjected to shot processing is performed order to manage quality.

CITATION LIST

Patent Literature

Patent Literature 1: Japanese Unexamined Patent Publication No. H5-279816

SUMMARY OF INVENTION

Technical Problem

However, there is also a case in which a desired effect is not given to the treatment target subjected to shot processing due to, for example, an inappropriate treatment target state before shot processing even when the device operation management is appropriately performed. That is, it is not possible to directly manage an actual surface side state and the like of the treatment target subjected to shot processing in the device operation management. In the product management, for example, when a destructive inspection should be performed, a partial inspection is performed instead of a total inspection. Accordingly, it is impossible to manage the processing degree for all products. It can be said that the same applies to the case of inspecting a specimen such as a test sample (see, for example, Patent Literature 1).

Further, discarding all treatment targets not having a desired effect causes a decline in productivity even when it is possible to manage the degree of shot processing for all treatment targets subjected to shot processing.

An aspect of the disclosure provides a surface treatment processing method and a surface treatment processing device capable of improving productivity.

Solution to Problem

A surface treatment processing method according to an aspect of the disclosure includes: a shot processing step of performing shot processing of shooting shot media at a treatment target; a first inspection step of nondestructively inspecting at least one of a surface side state and an external dimension of the treatment target subjected to the shot processing, evaluating that the treatment target is passed when an inspection result is within a first normal range set in advance, evaluating that the treatment target is failed when the inspection result is out of a first allowable range set in advance to include the first normal range, and evaluating that the treatment target is to be additionally processed when the inspection result is out of the first normal range but within the first allowable range; and an additional processing step of performing the shot processing again on the treatment target which is evaluated to be additionally processed.

There is a case in which a desired effect is not imparted to the treatment target due to the insufficient shot processing. In such a case, there is a possibility that a desired effect is imparted to the treatment target by the reshot processing. However, when the reshot processing is also performed on the treatment target not having a desired effect due to reasons other than the insufficient shot processing, productivity declines. According to the above-described configuration, at least one of the surface side state and the external dimension of the treatment target subjected to the shot processing is nondestructively inspected. In this inspection, the treatment target having a possibility of having a desired effect by the reshot processing is regarded to be additionally processed. Accordingly, it is possible to increase the number of the treatment targets having a desired effect while suppressing useless shot processing. Thus, productivity can be enhanced.

The surface treatment processing method according to an aspect of the disclosure may further include a reference value resetting step of resetting a reference value of a shot processing condition so as to suppress a ratio in which the inspection result of the first inspection step is out of the first normal range, based on a tendency of a change with time in the inspection result of the first inspection step. In this case, it is possible to increase the number of the treatment targets which are evaluated as having passed in the first inspection step.

In the surface treatment processing method according to an aspect of the disclosure, in the reference value resetting step, based on a tendency of a change with time of an average value for each predetermined period of the inspection result of the first inspection step, a timing at which the average value deviates from the first normal range may be predicted and the reference value may be reset before the timing. In this case, it is possible to effectively increase the number of the treatment targets which are evaluated as having passed in the first inspection step.

The surface treatment processing method according to an aspect of the disclosure may further include a storage step of storing the inspection result of the first inspection step. In this case, utilization of the inspection result is enhanced.

The surface treatment processing method according to an aspect of the disclosure may further include a second inspection step of nondestructively inspecting at least one of a surface side state and an external dimension of the treatment target to be subjected to the shot processing and evaluating that the treatment target is failed when the inspection result is out of a second allowable range set in advance. In the shot processing step, the shot processing may be performed on the treatment target which is not evaluated as having failed. In this case, at least one of the surface side state and the external dimension of the treatment target subjected to the shot processing is nondestructively inspected. In this inspection, evaluating that the treatment target is failed is performed when the inspection result is out of the second allowable range set in advance. The treatment target evaluated as having failed is excluded from the shot processing target in advance. Thus, useless shot processing is suppressed.

The surface treatment processing method according to an aspect of the disclosure may further include a condition setting step of setting a shot processing condition in response to the inspection result of the second inspection step for the treatment target which is not evaluated as having failed in the second inspection step. In the shot processing step, the shot processing may be performed in a shot processing condition set in the condition setting step. In this case, since it is possible to perform the shot processing corresponding to the treatment target, productivity can be further enhanced.

In the surface treatment processing method according to an aspect of the disclosure, in order to inspect a surface side state of the treatment target corresponding to an inspection target, each of the first inspection step and the second inspection step may include at least one of a step of measuring residual stress of a surface side of the treatment target, a step of performing a magnetic evaluation on the surface side of the treatment target by eddy currents, a step of measuring a color tone of the surface side of the treatment target, and a step of measuring surface roughness of the treatment target. In this case, it is possible to nondestructively inspect the surface side state of the treatment target before and after the shot processing.

A surface treatment processing device according to an aspect of the disclosure includes: a shooting unit which performs shot processing of shooting shot media at a treatment target; a first inspection unit which nondestructively inspects at least one of a surface side state and an external dimension of the treatment target subjected to the shot processing by the shooting unit; and a control unit which evaluates that the treatment target is passed when an inspection result of the first inspection unit is within a first normal range set in advance, evaluates that the treatment target is failed when the inspection result of the first inspection unit is out of a first allowable range set in advance to include the first normal range, and evaluates that the treatment target is to be additionally processed when the inspection result of the first inspection unit is out of the first normal range but within the first allowable range. The shooting unit performs the shot processing again on the treatment target which is evaluated to be additionally processed by the control unit.

There is a case in which a desired effect is not imparted to the treatment target due to the insufficient shot processing. In such a case, there is a possibility that a desired effect is imparted to the treatment target by the reshot processing. However, when the reshot processing is also performed on the treatment target not having a desired effect due to reasons other than the insufficient shot processing, productivity declines. According to the above-described configuration, at least one of the surface side state and the external dimension of the treatment target subjected to the shot processing is nondestructively inspected. In this inspection, the treatment target having a possibility of having a desired effect by the reshot processing is regarded to be additionally processed. Accordingly, it is possible to increase the number of the treatment targets having a desired effect while suppressing useless shot processing. Thus, productivity can be enhanced.

The surface treatment processing device according to an aspect of the disclosure may further include a storage unit which stores the inspection result obtained by the first inspection unit. In this case, utilization of the inspection result is enhanced.

Advantageous Effects of Invention

According to the surface treatment processing method and the surface treatment processing device of an aspect of the present disclosure, productivity can be enhanced.

BRIEF DESCRIPTION OF DRAWINGS

FIG. 3(A) is a schematic diagram showing a part of a control system of the surface treatment processing device of FIG. 2 in the form of a block and FIG. 3(B) is a schematic diagram showing a main part of a shot peening processing device in a simplified state.

FIG. 4(A) is a circuit configuration diagram of a magnetic evaluation device and FIG. 4(B) is a perspective view showing a configuration of an inspection detector in a see-through state.

FIG. 9(A) is a flowchart showing an adjustment process before a residual stress is measured and FIG. 9(B) is a flowchart showing a method of measuring a residual stress on a surface side of an inspection target.

DESCRIPTION OF EMBODIMENTS

First Embodiment

Figure 1A:
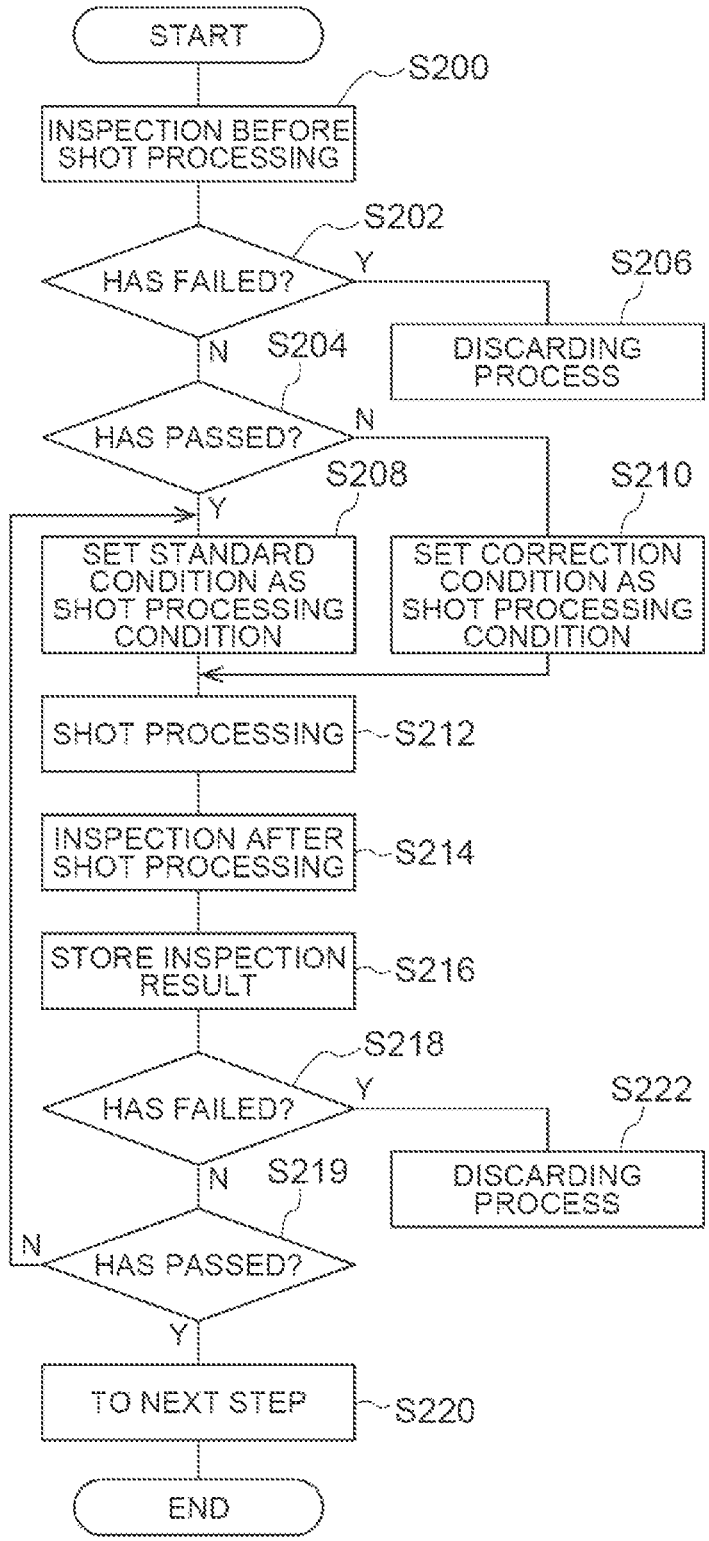
FIG. 1(A) is a flowchart showing a flow of a series of processes and FIG. 1(B) is a flowchart showing a flow of a process performed when a control unit is activated before daily processing starts.

A surface treatment processing method according to a first embodiment of the disclosure will be described with reference to FIGS. 1(A) to 9(B). FIG. 2 is a perspective showing a surface treatment processing device 10 used in the surface treatment processing method according to the embodiment. First, the surface treatment processing device 10 will be described. Additionally, as a treatment target W which is processed by the surface treatment processing device 10 of the embodiment, for example, a metal product can be applied. In the embodiment, as an example, a gear for an automobile transmission is applied. Further, a treatment target (a product) formed into a product shape by plastic and mechanical working is subjected to a heat treatment as an example and the treatment target is used as a treatment target W to be subjected to shot peening processing (surface treatment processing) by the surface treatment processing device 10. Then, as the treatment target W, a treatment target having a compressive residual stress on a surface side at a stage to be conveyed into the surface treatment processing device 10 is applied as an example.

(Overall Configuration of Surface Treatment Processing Device 10)

As shown in FIG. 2, the surface treatment processing device 10 includes a carry-in conveyor 12, a pretreatment inspection zone 14, two inspection tables 16A and 16B, a six-axis robot 18, a magnetic evaluation device 20, and a stress measurement device 22. The carry-in conveyor 12 carries the treatment target W loaded on the carry-in conveyor 12 in a conveying direction (see the arrow X1) which is predetermined. The pretreatment inspection zone 14 is provided at the center of the carry-in conveyor 12 in the conveying direction. In the pretreatment inspection zone 14, two inspection tables 16A and 16B are provided to straddle the carry-in conveyor 12. The six-axis robot 18 is disposed at the lateral of the carry-in conveyor 12 in the pretreatment inspection zone 14.

The six-axis robot 18 is a robot capable of lifting and moving the treatment target W. The six-axis robot 18 is able to move the treatment target W so that the treatment target is disposed on the inspection tables 16A and 16B (that is, inspection positions). That is, the six-axis robot 18 is able to move the treatment target W disposed on the carry-in conveyor 12 so that the treatment target is disposed on the inspection table 16A and is able to move the treatment target W disposed on the inspection table 16A so that the treatment target is disposed on the inspection table 16B. The six-axis robot 18 is able to move the treatment target W disposed on the inspection table 16B so that the treatment target is disposed on the carry-in conveyor 12 (the downstream side) and is able to extract the treatment target W disposed on the inspection table 16B to the outside of the line of the surface treatment process.

One inspection table 16A is provided with the magnetic evaluation device 20 as an inspection device. In the other inspection table 16B, the stress measurement device 22 is adjacently disposed as an inspection device. The magnetic evaluation device 20 and the stress measurement device 22 constitute a pretreatment inspection unit 14E. In this embodiment, the magnetic evaluation device 20 is disposed closer to the upstream in the conveying direction (see the arrow X1) than the stress measurement device 22, but the stress measurement device 22 may be disposed closer to the upstream in the conveying direction (see the arrow X1) than the magnetic evaluation device 20.

The magnetic evaluation device 20 inspects an entire surface layer state of a processing target portion of the treatment target W disposed on the inspection table 16A. For example, the magnetic evaluation device 20 evaluates an unevenness presence/absence state and a metal structure state in the treatment target W by eddy currents. The magnetic evaluation device 20 may output a signal representing a voltage value as a result of an inspection performed by the magnetic evaluation device 20. The magnetic evaluation device 20 of this embodiment evaluates (determines) whether the result of the inspection performed by the magnetic evaluation device 20 is within a second normal range set in advance. The magnetic evaluation device 20 outputs a signal representing the evaluation result to a control unit 26 (see FIG. 3(A)) to be described later. The stress measurement device 22 measures a residual stress of the treatment target W disposed on the inspection table 16B by using an X-ray diffraction method. The stress measurement device 22 of this embodiment measures a residual stress only for a specified measurement point while not measuring a stress state for the entire treatment target W. The stress measurement device 22 outputs a signal representing a stress value as a measurement result (an inspection result) thereof to the control unit 26 (see FIG. 3(A)) to be described later.

As described above, in order to appropriately determine whether the treatment target W is suitable for shot peening processing, the homogeneity of the entire processing target surface of the treatment target W is evaluated by the magnetic evaluation device 20 and a specific residual stress for a part of the processing target range is measured by the stress measurement device 22. The magnetic evaluation device 20 and the stress measurement device 22 will be described later in detail.

FIG. 3(A) is a schematic diagram showing a part of a control system of the surface treatment processing device 10 of FIG. 2 in the form of a block. As shown in FIG. 3(A), the surface treatment processing device 10 further includes the control unit 26. The magnetic evaluation device 20, the stress measurement device 22, and the six-axis robot 18 are connected to the control unit 26 (the control unit). The control unit 26 includes, for example, a storage device, an arithmetic process device, and the like. Although not specifically shown, the arithmetic process device includes, for example, a CPU (Central Processing Unit), a memory, a storage unit, and a communication interface (I/F) unit and these components are connected to each other via a bus. The storage unit stores an arithmetic processing program. The storage device and the arithmetic process device can communicate with each other by the communication interface (I/F) unit thereof.

The control unit 26 receives the evaluation result of the magnetic evaluation device 20 from the magnetic evaluation device 20 and receives the inspection result of the stress measurement device 22 from the stress measurement device 22. The evaluation result of the magnetic evaluation device 20 is information representing whether the inspection result of the magnetic evaluation device 20 is within a second normal magnetic range (a second normal range for magnetism) set in advance. The evaluation on whether the inspection result of the magnetic evaluation device 20 is within the second normal magnetic range is performed by a determination means 96 to be described later. The control unit 26 determines (evaluates) whether the inspection result obtained by the stress measurement device 22 is within a second allowable stress range (a second allowable range for stress) set in advance and whether the inspection result obtained by the stress measurement device 22 is within a second normal stress range (a second normal range for stress) set in advance. In the present specification, the "allowable range" is set in advance to be wider than the "normal range" and to include the "normal range". The control unit 26 evaluates (determines) that the result is "passed", that is, processing can performed in a standard shot processing condition (a shot peening processing condition) when both inspection results of the magnetic evaluation device 20 and the stress measurement device 22 are within the first normal range. The control unit 26 determines (evaluates) that the treatment target is "conditionally passed" for which the magnetic evaluation device 20 obtained an evaluation of normal (the surface is homogeneous), and for which the inspection result obtained by the stress measurement device 22 can be considered normal by changing the standard shot processing condition, despite being slightly lower or slightly higher than the standard value (the second normal stress range). The "conditionally passed" state means that processing can be performed while the shot processing condition is changed. The control unit 26 evaluates (determines) that the result is "failed" (in this embodiment, an object to be discarded) when the result is neither "passed" nor "conditionally passed" (when the inspection result of the pretreatment inspection unit 14E is out of the second allowable stress range which is predetermined, that is, in this embodiment, the inspection result of the stress measurement device 22 is out of the second allowable stress range).

That is, the control unit 26 evaluates that the treatment target W is "passed" when the inspection result of the magnetic evaluation device 20 the second normal magnetic range set in advance and the inspection result of the stress measurement device 22 is within the second normal stress range set in advance. The control unit 26 evaluates that the treatment target W is "conditionally passed" when the inspection result of the magnetic evaluation device 20 is within the second normal magnetic range set in advance and the inspection result of the stress measurement device 22 is out of the second normal stress range set in advance, but is within the second allowable stress range set in advance. The control unit 26 evaluates that the treatment target W is "failed" when the inspection result of the magnetic evaluation device 20 is out of the second normal magnetic range set in advance or the inspection result of the stress measurement device 22 is out of the second allowable stress range set in advance.

In the case of "failed", the control unit 26 controls the six-axis robot 18 so that the treatment target W is extracted to the outside of the line of the surface treatment process. In the case other than "failed", that is, in the case of "passed" and "conditionally passed", the control unit 26 controls the six-axis robot 18 so that the treatment target W is returned to the carry-in conveyor 12 (see FIG. 2).

As shown in FIG. 2, the surface treatment processing device 10 further includes a carry-in/carry-out loader 28 and a shot peening processing device 30 (a shot processing device). An upstream side of a carry-out conveyor 66 to be described later is disposed at one lateral (the front side of the drawing) of the downstream side of the carry-in conveyor 12. A cabinet 32 of the shot peening processing device 30 (the shot processing device) which is a shooting unit is disposed at the other lateral (the rear side of the drawing) of the downstream side of the carry-in conveyor 12. The conveying direction (see the arrow X2) of the carry-out conveyor 66 is set to the same direction as the conveying direction (see the arrow X1) of the carry-in conveyor 12. The cabinet 32 is formed in a box shape. A side wall on the side of the carry-in conveyor 12 of the cabinet 32 is provided with a carry-in/carry-out opening 32A. Further, the carry-in/carry-out loader 28 (the carry-in/carry-out device) is provided at the upper side of the downstream side of the carry-in conveyor 12. The carry-in/carry-out loader 28 carries the treatment target W on the carry-in conveyor 12 into the cabinet 32 from the opening 32A of the cabinet 32 and carries the treatment target W in the cabinet 32 onto the carry-out conveyor 66 from the opening 32A of the cabinet 32.

The carry-in/carry-out loader 28 includes a pair of rails 28A and a carriage 28B. The pair of rails 28A extends in a direction orthogonal to the conveying direction of each of the carry-in conveyor 12 and the carry-out conveyor 66. The carriage 28B can travel along the pair of rails 28A. The carriage 28B is connected to the control unit 26 shown in FIG. 3(A). A mechanism for driving the carriage 28B is not shown in the drawings. The driving of the carriage 28B is controlled by the control unit 26. Although not described in detail, a lower surface of the carriage 28B shown in FIG. 2 is provided with a hanging mechanism (not shown) for hanging the treatment target W. A lower portion for receiving and delivering the treatment target W in the hanging mechanism is movable up and down.

FIG. 3(B) is a schematic diagram showing a main part of the shot peening processing device 30 in a simplified state. A basic configuration of the shot peening processing device 30 is substantially the same as the configuration disclosed in Japanese Unexamined Patent Publication No. 2012-101304. As shown in FIG. 3(B), the shot peening processing device 30 includes a shot processing chamber 34, a product placement portion 36, and a projection device 40. The shot processing chamber 34 is formed inside the cabinet 32. In the shot processing chamber 34, shot peening processing (broadly speaking, surface processing) of the treatment target W is performed by allowing shot media (shots of steel balls or the like) to collide with the treatment target W. A product placement portion 36 on which the treatment target W is placed is provided at the lower portion inside the shot processing chamber 34.

A nozzle 64 of the projection device (the air nozzle type shot peening processing device) 40 is provided at the side portion inside the cabinet 32. The projection device 40 projects compressed air including shot media from the nozzle 64 so that the shot media collide with the treatment target W of the shot processing chamber 34. Hereinafter, the projection device 40 will be briefly described.

As shown in FIG. 3(B), the projection device 40 includes a shot media tank 42, a quantitative supply device 44, and a pressurizing tank 46. The shot media tank 42 is connected to the pressurizing tank 46 via the quantitative supply device 44. The quantitative supply device 44 includes a poppet valve 44I which is provided between the pressurizing tank 46 and the quantitative supply device. The poppet valve 44I is connected to the control unit 26 (see FIG. 3(A)). The pressurizing tank 46 is provided with a level meter (not shown) which detects the amount of the shot media inside the pressurizing tank 46. The level meter is connected to the control unit 26 (see FIG. 3(A)). The control unit 26 (see FIG. 3(A)) controls the poppet valve 44I of the quantitative supply device 44 to be opened when the level meter detects that the amount of the shot media inside the pressurizing tank 46 is smaller than a predetermined value. The poppet valve 44I is driven by a driving cylinder (not shown). Opening and closing of the poppet valve 44I is controlled by the control unit 26 (see FIG. 3(A)) in response to the detection state of the level meter. In a state in which the poppet valve 44I is opened, an appropriate amount of the shot media is sent from the shot media tank 42 to the pressurizing tank 46 via the quantitative supply device 44.

An air inlet 46A is formed at the upper portion of the pressurizing tank 46. One end portion of the connection pipe 48 is connected to the air inlet 46A. The other end portion of the connection pipe 48 is connected to an intermediate portion of the passage of the connection pipe 50. One end portion of the upstream side (the right side of the drawing) of the passage of the connection pipe 50 is connected to a compressor 52 (a compressed air supply device) for supplying compressed air. That is, the pressurizing tank 46 is connected to the compressor 52 via connection pipes 48 and 50. The compressor 52 is connected to the control unit 26 (see FIG. 3(A)). An air flow control valve 54 (an electro-pneumatic proportional valve) is provided at an intermediate portion of the passage of the connection pipe 48. When the air flow control valve 54 is opened, compressed air is supplied from the compressor 52 into the pressurizing tank 46. Accordingly, the inside of the pressurizing tank 46 can be pressurized.

A shot outlet 46B provided with a cut gate 56 is formed at the lower portion of the pressurizing tank 46. One end portion of the connection pipe 58 is connected to the shot outlet 46B. The other end portion of the connection pipe 58 is connected to an intermediate portion of the passage of the connection pipe 50. A shot flow control valve 60 is provided at an intermediate portion of the passage of the connection pipe 58. As the shot flow control valve 60, for example, a magnet valve and a mixing valve are applied. A joint portion with the connection pipe 58 in the connection pipe 50 constitutes a mixing portion 50A. An air flow control valve 62 (an electropneumatic proportional valve) is provided at the passage downstream side (the left side of the drawing) of the connection portion with the connection pipe 48 and at the passage upstream side (the right side of the drawing) of the mixing portion 50A in the connection pipe 50.

That is, when the cut gate 56 and the shot flow control valve 60 are opened and the air flow control valve 62 is opened while the inside of the pressurizing tank 46 is pressurized, the shot media supplied from the pressurizing tank 46 and the compressed air supplied from the compressor 52 are mixed at the mixing portion 50A and flow to the passage downstream side (the left side of the drawing) of the connection pipe 50.

The projection (shot peening) nozzle 64 is connected to the passage downstream end portion of the connection pipe 50. Accordingly, the shot media flowing to the mixing portion 50A is projected from the tip of the nozzle 64 while being mixed with the compressed air. The air flow control valves 54 and 62, the cut gate 56, and the shot flow control valve 60 are connected to the control unit 26 shown in FIG. 3(A).

The control unit 26 shown in FIG. 3(A) stores a program for performing shot peening processing (shot processing) on the treatment target W by the projection device 40. The surface treatment processing device 10 further includes an operation unit 24 which is connected to the control unit 26. With the use of the operation unit 24, it is possible to input a reference value (a standard setting reference value) of a shot processing condition when performing shot peening processing on the treatment target W (see FIG. 2). The operation unit 24 outputs a signal in response to an input operation to the control unit 26. Then, the control unit 26 controls the compressor 52, the air flow control valves 54 and 62, the cut gate 56, the shot flow control valve 60, and the like shown in FIG. 3(B) on the basis of a signal output from the operation unit 24 and inspection results output from the magnetic evaluation device 20 and the stress measurement device 22. That is, the control unit 26 shown in FIG. 3(A) controls the shot processing condition of the projection device 40, more specifically, a shot media projection volume (a shot media flow amount) per unit time, a shot media projection pressure, a shot media projection timing, or a processing time.

In this embodiment, the control unit 26 sets the shot processing condition for shooting the shot media at the treatment target W of the inspection target in response to the inspection result of the pretreatment inspection unit 14E when the evaluation (determination) result is not "failed". Specifically, the control unit 26 sets the standard shot processing condition (the reference value) as the shot processing condition for the treatment target W of the inspection target determined as "passed". The control unit 26 sets the shot processing condition obtained by correcting the standard shot processing condition (the reference value) for the treatment target W of the inspection target determined as "conditionally passed".

That is, the control unit 26 controls the projection device 40 so that the shot media are projected (shot) at the treatment target W of the inspection target determined as "passed" in the standard shot processing condition. The control unit 26 controls the projection device 40 so that the shot media are projected (shot) at the treatment target W of the inspection target determined as "conditionally passed" in the shot processing condition obtained by correcting the standard shot processing condition. More specifically, the shot media are projected at the treatment target W, in which the inspection result of the stress measurement device 22 is slightly smaller than the standard value (the second normal stress range), of the treatment target W of the inspection target determined as "conditionally passed", for example, in the shot processing condition obtained by correcting the standard shot processing condition so that the projection pressure (the shooting pressure) increases in order to compensate for a compressive residual stress. In contrast, the shot media are projected at the treatment target W in which the inspection result of the stress measurement device 22 is slightly larger than the standard value (the second normal stress range) in the treatment target W of the inspection target determined as "conditionally passed", for example, in the shot processing condition obtained by correcting the standard shot processing condition so that the projection pressure (the shooting pressure) decreases in order to avoid excessive accumulation of the compressive residual stress. The projection pressure for projecting the shot media can be increased and decreased by controlling the input values (the opening degrees of the air flow control valves 54 and 62) of the air flow control valves 54 and 62 which are electropneumatic proportional valves shown in FIG. 3(B).

Although not described in detail, in this embodiment, as an example, the product placement portion 36 has a so-called multi-table structure. That is, a revolving table 36A is disposed in the product placement portion 36 and a plurality of spinning tables 36B are disposed on the revolving table 36A so as to be located at a plurality of positions on the concentric circle of the revolving table 36A. The revolving table 36A includes a rotation shaft 35X which is formed in the vertical direction of the device. The revolving table 36A is able to rotate (revolve) about the rotation shaft 35X. The revolving table 36A is disposed at a position including a projection range in which the shot media are projected by the projection device 40 and a non-projection range other than the projection range. The diameter of the spinning table 36B is shorter than the diameter of the revolving table 36A. The spinning table 36B includes a rotation shaft 35Z which is parallel to the rotation shaft 35X of the revolving table 36A. The spinning table 36B is able to rotate (spin) about the rotation shaft 35Z.

The treatment target W is disposed on the spinning table 36B. A pressing mechanism (not shown) is provided at the upper side of the projection range in the revolving table 36A. A pressing portion of the pressing mechanism is rotatable along with the treatment target W while pressing the treatment target W on the spinning table 36B from above. A revolving driving mechanism (not shown) rotating (revolving) the revolving table 36A and a spinning driving mechanism (not shown) rotating (spinning) the spinning table 36B are respectively connected to the control unit 26 (see FIG. 3(A)). The operations of the revolving driving mechanism and the spinning driving mechanism are respectively controlled by the control unit 26 (see FIG. 3(A)). Since these components are controlled, the relative shot position for the treatment target W is controlled. The relative shot position is one of the shot processing conditions.

As shown in FIG. 2, the surface treatment processing device 10 includes the carry-out conveyor 66, an aftertreatment inspection zone 68, two inspection tables 70A and 70B, a six-axis robot 72, a magnetic evaluation device 74, and a stress measurement device 76. The carry-out conveyor 66 conveys the treatment target W loaded on the carry-out conveyor 66 in a conveying direction (see the arrow X2) which is predetermined. The conveying direction of the carry-out conveyor 66 is set to be the same as the conveying direction (see the arrow X1) of the carry-in conveyor 12. The aftertreatment inspection zone 68 is provided at the center of the carry-out conveyor 66 in the conveying direction. In the aftertreatment inspection zone 68, two inspection tables 70A and 70B are provided to straddle the carry-out conveyor 66. The six-axis robot 72 is disposed at the lateral of the carry-out conveyor 66 in the aftertreatment inspection zone 68.

The six-axis robot 72 is a robot capable of lifting and moving the treatment target W. The six-axis robot 72 is able to move the treatment target W so that the treatment target is disposed on the inspection tables 70A and 70B (that is, inspection positions). That is, the six-axis robot 72 is able to move the treatment target W disposed on the carry-out conveyor 66 so that the treatment target is disposed on the inspection table 70A and is able to move the treatment target W disposed on the inspection table 70A so that the treatment target is disposed on the inspection table 70B. The six-axis robot 72 is able to move the treatment target W disposed on the inspection table 70B so that the treatment target is disposed on the carry-out conveyor 66 (the downstream side) and is able to extract the treatment target W disposed on the inspection table 70B to the outside of the line of the surface treatment process.

In one inspection table 70A, the magnetic evaluation device 74 is disposed as an inspection device. In the other inspection table 70B, the stress measurement device 76 is adjacently disposed as an inspection device. The magnetic evaluation device 74 and the stress measurement device 76 constitute an aftertreatment inspection unit 68E. In this embodiment, the magnetic evaluation device 74 is disposed upstream in the conveying direction (see the arrow X2) than the stress measurement device 76, but the stress measurement device 76 may be disposed upstream in the conveying direction (see the arrow X2) than the magnetic evaluation device 74.

The magnetic evaluation device 74 inspects an entire surface layer state of a processing target portion of the treatment target W disposed on the inspection table 70A. For example, the magnetic evaluation device 74 evaluates an unevenness presence/absence state and a metal structure state in the treatment target W by eddy currents. The magnetic evaluation device 74 may output a signal representing a voltage value as a result of an inspection performed by the magnetic evaluation device 74. The magnetic evaluation device 74 of this embodiment evaluates (determines) whether the result of the inspection performed by the magnetic evaluation device 74 is within a first normal magnetic range (a first normal range for magnetism) set in advance. The magnetic evaluation device 74 outputs a signal representing the evaluation result to the control unit 26 (see FIG. 3(A)). The first normal magnetic range may be the same as or different from the second normal magnetic range.

The stress measurement device 76 measures a residual stress of the treatment target W disposed on the inspection table 70B by using an X-ray diffraction method. The stress measurement device 76 of this embodiment measures a residual stress only for a specified point while not measuring a stress state for the entire treatment target W. The stress measurement device 76 outputs a signal representing a stress value as a measurement result (an inspection result) thereof to the control unit 26 (see FIG. 3(A)). In this embodiment, the magnetic evaluation device 74 of the aftertreatment inspection zone 68 has the same configuration as the magnetic evaluation device 20 of the pretreatment inspection zone 14. The stress measurement device 76 of the aftertreatment inspection zone 68 has the same configuration as the stress measurement device 22 of the pretreatment inspection zone 14.

As shown in FIG. 3(A), the magnetic evaluation device 74, the stress measurement device 76, and the six-axis robot 72 are connected to the control unit 26. The control unit 26 receives the evaluation result of the magnetic evaluation device 74 from the magnetic evaluation device 74 and receives the inspection result of the stress measurement device 76 from the stress measurement device 76. The evaluation result of the magnetic evaluation device 74 is information indicating whether the inspection result of the magnetic evaluation device 74 is within a first normal magnetic range (a first normal range for magnetism) set in advance. An evaluation on whether the inspection result of the magnetic evaluation device 74 is within the first normal magnetic range is performed by a determination means 96 to be described later. The control unit 26 determines (evaluates) whether the inspection result of the stress measurement device 76 is within a first allowable stress range (a first allowable range for stress) set in advance and the inspection result of the stress measurement device 76 is within a first normal stress range (a first normal range for stress) set in advance. Additionally, the first allowable stress range may be the same as or different from the second allowable stress range. Further, the first normal stress range may be the same as or different from the second normal stress range. The first normal stress range is also referred to as a standard stress range.

The control unit 26 evaluates (determines) that the treatment target is "passed" when the inspection results of the magnetic evaluation device 74 and the stress measurement device 76 are within first normal ranges (the inspection results of the aftertreatment inspection unit 68E are within first normal ranges set in advance). The control unit 26 evaluates (determines) that the treatment target is "to be additionally processed" when the inspection result of the magnetic evaluation device 74 is within the first normal magnetic range and the inspection result of the stress measurement device 76 is out of the first normal stress range but is within the first allowable stress range. The control unit 26 evaluates (determines) that the treatment target is "failed" (in the embodiment, an object to be discarded) when the inspection result of the magnetic evaluation device 74 is out of the first normal magnetic range or the inspection result of the stress measurement device 76 is out of the first allowable stress range.

That is, the control unit 26 evaluates that the treatment target is "passed" when the inspection result of the magnetic evaluation device 74 is within the first normal magnetic range set in advance and the inspection result of the stress measurement device 76 is within the first normal stress range set in advance. The control unit 26 evaluates that the treatment target is "failed" when the inspection result of the magnetic evaluation device 74 is out of the first normal magnetic range set in advance or the inspection result of the stress measurement device 76 is out of the first allowable stress range set in advance. The control unit 26 evaluates that the treatment target is "to be additionally processed" when the inspection result of the magnetic evaluation device 74 is within the first normal magnetic range and the inspection result of the stress measurement device 76 is out of the first normal stress range and is within the first allowable stress range.

In the case of "passed", the control unit 26 controls the six-axis robot 72 so that the treatment target W is returned to the carry-out conveyor 66 (see FIG. 2). In the case of "failed", the control unit 26 controls the six-axis robot 72 so that the treatment target W is extracted to the outside of the line of the surface treatment process. The treatment target W which is returned to the carry-out conveyor 66 (see FIG. 2) flows to the next step. In the case of "to be additionally processed", the control unit 26 sets the shot processing condition obtained by correcting the standard shot processing condition (the reference value) in response to the inspection result of the aftertreatment inspection unit 68E for the treatment target W. The control unit 26 controls the six-axis robot 72 so that the treatment target W which is determined as "to be additionally processed" is loaded on a returning conveyor (not shown). The returning conveyor is provided in parallel to the carry-in conveyor 12 (see FIG. 2) and the carry-out conveyor 66 (see FIG. 2). The treatment target W loaded on the returning conveyor is conveyed to the front of the shot peening processing device 30 (see FIG. 2). The treatment target W which is conveyed by the returning conveyor is conveyed into the cabinet 32 (see FIG. 2) by the carry-in/carry-out loader 28 (see FIG. 2) similarly to the non-processed treatment target W conveyed by the carry-in conveyor 12. The control unit 26 controls the projection device 40 to inject (shoot) shot media to the treatment target W which is determined as "to be additionally processed" in the shot processing condition obtained by correcting the standard shot processing condition. Accordingly, the projection device 40 performs shot processing of shooting shot media at the treatment target W which is evaluated as "to be additionally processed".

Further, the control unit 26 stores the inspection results of the magnetic evaluation device 74 and the stress measurement device 76 in the storage device. The control unit 26 causes an arithmetic process device to calculate an average daily value (in a broad sense, "every predetermined period") of the inspection result (data) obtained by the stress measurement device 76 of the aftertreatment inspection unit 68E (see FIG. 2, an aftertreatment inspection step to be described later) and stored in the storage device for, for example, several tens of days (or several days) or several tens of weeks (in the embodiment, twenty days as an example). Hereinafter, the average value will be simply referred to as an "average stress value". The inspection result of the treatment target W subjected to the reshot processing (the additional processing step) is excluded from the inspection result obtained by the stress measurement device 76 of the aftertreatment inspection unit 68E at the time of calculating the average stress value. Additionally, the inspection result of the treatment target W subjected to the reshot processing may not be excluded.

The control unit 26 further calculates a difference between an average stress value and a median stress value (a median value of the first normal stress range) as a divergence amount in the arithmetic process device. The control unit 26 calculates a slope and an intercept of a linear equation indicating a tendency of increasing and decreasing a divergence amount (a tendency of a change with time) from the date (horizontal axis) and the daily divergence amount (vertical axis) calculated by the square method in the arithmetic process device. The control unit 26 determines whether the inspection result of the stress measurement device 76 tends to deviate from the first normal stress range (the first normal range for stress) as a trend in the medium to long term. The control unit 26 calculates a date (in a broad sense, a period) predicted that the stress average value will deviate from the first normal stress range (the first normal range for stress) as a predicted date. Then, the control unit 26 resets a reference value (a standard setting reference value) of the shot processing condition so as to suppress a ratio in which the inspection result of the aftertreatment inspection unit 68E (the stress measurement device 76) is out of the first normal stress range at a predetermined timing to be described later on the basis of the tendency of a change with time of the inspection result of the aftertreatment inspection unit 68E (the stress measurement device 76). Additionally, the first normal stress range may be the same as or different from the second normal stress range.

(Magnetic Evaluation Devices 20 and 74)

Next, the magnetic evaluation devices 20 and 74 will be described with reference to FIGS. 4(A) and 4(B). FIG. 4(A) shows a circuit configuration of the magnetic evaluation device 20 (the surface characteristic inspection device). FIG. 4(B) is a perspective view showing a configuration of an inspection detector 86 of the magnetic evaluation device 20 in a see-through state. Since the magnetic evaluation device 20 and the magnetic evaluation device 74 shown in FIG. 2 have the same device configuration, the magnetic evaluation device of FIG. 4(A) is represented by the reference numeral 20.

As shown in FIG. 4(A), the magnetic evaluation device 20 includes an AC power source 78, an AC bridge circuit 80, and an evaluation device 90. The AC power source 78 is able to supply AC power with variable frequency to the AC bridge circuit 80.

The AC bridge circuit 80 includes a variable resistor 82, the inspection detector 86, and a reference detector 84 which detects a reference state corresponding to a reference for comparison with the output from the inspection detector 86. In the inspection detector 86, a coil is disposed to excite an eddy current in the treatment target W (hereinafter, appropriately referred to as a "subject W") which is a subject (an inspection target). The variable resistor 82 can distribute a resistor $R_A$ into a resistor R1 and a resistor R2 according to a distribution ratio γ. The distribution ratio γ is variable. The resistor R1 and the resistor R2 constitute a bridge circuit along with the reference detector 84 and the inspection detector 86. In this embodiment, a point A and a point B are connected to the AC power source 78 of the magnetic evaluation device 20. A point C and a point D are connected to an amplifier 91. The point A is a distributing point between the resistor R1 and the resistor R2. The point B is located between the reference detector 84 and the inspection detector 86. The point C is located between the resistor R1 and the reference detector 84. The point D is located between the resistor R2 and the inspection detector 86. The reference detector 84 and the inspection detector 86 are grounded to reduce noise. The variable resistor 82 and the reference detector 84 are disposed on a circuit board 88 as an example.

The evaluation device 90 includes an amplifier 91, an absolute value circuit 92, a low pass filter (LPF) 93, a phase comparator 94, a frequency adjuster 95, a determination means 96, a display means 97, and a temperature measurement means 98. The amplifier 91 amplifies a voltage signal output from the AC bridge circuit 80. The absolute value circuit 92 performs full-wave rectification. The LPF 93 performs DC conversion. The phase comparator 94 compares the phases of the AC power supplied from the AC power source 78 and the power supplied from the amplifier 91. The frequency adjuster 95 adjusts the frequency of the AC power supplied from the AC power source 78. The determination means 96 performs a non-equilibrium adjustment for optimizing the distribution of the resistor R1 and the resistor R2. Furthermore, the determination means 96 receives an output from the LPF 93 as the inspection results of the magnetic evaluation devices 20 and 74. The determination means 96 determines whether the surface state of the treatment target W is acceptable on the basis of the inspection result. Specifically, the determination means 96 evaluates (determines) whether the inspection result is within the second normal magnetic range or the first normal magnetic range set in advance. When the surface state of the treatment target W is homogeneous, the inspection results of the magnetic evaluation devices 20 and 74 are within the second normal magnetic range or the first normal magnetic range. The display means 97 displays and warns the evaluation result obtained by the determination means 96. The temperature measurement means 98 detects a temperature of an evaluation position.

The amplifier 91 is connected to the point C and the point D. A potential difference between the point C and the point D is input to the amplifier 91. An output of the amplifier 91 is connected to the absolute value circuit 92. An output of the absolute value circuit 92 is connected to the LPF 93. An output of the LPF 93 is connected to the determination means 96. The phase comparator 94 is connected to the AC power source 78, the amplifier 91, and the determination means 96. The frequency adjuster 95 is connected to the AC power source 78 and the amplifier 91. The determination means 96 is able to change the position of the point A of the AC bridge circuit 80, that is, the distribution ratio γ between the resistor R1 and the resistor R2 by outputting a control signal.

The temperature measurement means 98 is formed as a non-contact type infrared sensor or a thermocouple and outputs a surface temperature signal of the subject W to the determination means 96. The determination means 96 determines whether the surface treatment state of the subject W is acceptable when a temperature of the subject W detected by the temperature measurement means 98 is within a predetermined range. The determination means 96 does not determine whether the surface treatment state of the subject (the treatment target) W is acceptable when the temperature detected by the temperature measurement means 98 is out of the predetermined range.

The inspection detector 86 and the reference detector 84 have the same configuration. As the inspection detector 86 and the reference detector 84, a detector which is formed by winding a coil on an outer periphery of a core through which an evaluation unit of the subject W is insertable is used. The detector is able to excite an eddy current in the subject W by moving the coil toward the surface of the subject W. That is, the coil is wound to surround the surface characteristic inspection region of the subject W and faces the surface characteristic inspection region of the subject W. Here, a state in which the surface characteristic inspection region of the subject W is surrounded means that an eddy current is excited in the surface characteristic inspection region while the coil surrounds (encloses) at least a part of the surface characteristic inspection region.

As shown in FIG. 4(B), the inspection detector 86 includes a core 86A and a coil 86B. The core 86A has a cylindrical shape and is disposed to cover the subject W (which is depicted as a cylindrical body in the drawing). The coil 86B includes an enameled copper wire wound on the outer peripheral surface of the core 86A. In this embodiment, a cylindrical magnetic shield 86C is provided to surround the core 86A on which the coil 86B is wound. The core 86A is formed of a non-magnetic material, for example, resin. The shape of the core 86A may not be a cylindrical shape as long as the subject W can be disposed therein. The inspection detector 86 may not include the core 86A as long as the coil 86B can maintain the shape.

The inspection detector 86 is disposed so that the coil 86B surrounds the inspection target surface (the surface characteristic inspection region) of the subject W and the coil 86B opposes the inspection target surface of the subject W. When AC power with a predetermined frequency is supplied to the coil 86B by the AC power source 78 (see FIG. 4(A)) in this state, an AC magnetic field is generated. As a result, an eddy current flowing in a direction intersecting the AC magnetic field in the surface of the subject W is excited. The eddy current changes in response to the electromagnetic characteristics of the residual stress layer. For this reason, the phase and the amplitude (impedance) of the output waveform (voltage waveform) output from the amplifier 91 (see FIG. 4(A)) change in response to the characteristics (the surface treatment state) of the residual stress layer. According to a change in output waveform, the electromagnetic characteristics of the surface treatment layer can be detected and the inspection can be performed.

That is, the evaluation device 90 shown in FIG. 4(A) evaluates the surface characteristics of the subject W on the basis of the output signal from the AC bridge circuit 80. At this time, since AC power is supplied to the AC bridge circuit 80, the AC bridge circuit 80 is in a state in which the inspection detector 86 detects electromagnetic characteristics of the subject W and the reference detector 84 detects a reference state. The determination means 96 of the evaluation device 90 is connected to the control unit 26. The determination means 96 outputs a signal according to the evaluation result to the control unit 26. The determination means 96 outputs a signal representing "unavailable inspection" to the control unit 26 when the temperature detected by the temperature measurement means 98 is out of a predetermined range and a determination is avoided. Accordingly, the determination means 96 notifies the control unit 26 that the determination result cannot be output.

The determination means 96 outputs a signal representing the "unavailable inspection" to the display means 97. The display means 97 receives this signal and displays and warns a state of "unavailable inspection" as the evaluation result of the determination means 96. Accordingly, for example, an operator may inspect the magnetic evaluation devices 20 and 74, improve the operation environment if necessary, and may operate the magnetic evaluation devices 20 and 74 again. For example, the operator may invalidate the inspection result obtained by the evaluation device 90 and operate the magnetic evaluation devices 20 and 74 again. Accordingly, it is possible to evaluate the surface characteristics of the subject W again.

<Inspection Method by Magnetic Evaluation Device 20>

Next, an inspection method by the magnetic evaluation device 20 will be described. First, the inspection detector 86 is disposed in the subject W or the subject W is disposed for the inspection detector 86 so that an eddy current is excited in the subject W while AC power is supplied from the AC power source 78 to the AC bridge circuit 80 (an arrangement step). That is, the inspection detector 86 is disposed to surround the subject W disposed in advance or the subject W is disposed to be inserted into the inspection detector 86 disposed in advance. Next, the evaluation device 90 evaluates the surface characteristics of the subject W on the basis of an output signal output from the AC bridge circuit 80 (an evaluation step). Then, the evaluation result is output from the evaluation device 90 to the control unit 26.

As for the magnetic evaluation by an eddy current, the magnetic evaluation can be performed by using a device disclosed in, for example, Japanese Unexamined Patent Publication No. 2013-529286, Japanese Unexamined Patent Publication No. 2015-525336, or International Publication No. 2015/107725.

(Stress Measurement Devices 22 and 76)

Next, the stress measurement devices 22 and 76 will be described with reference to FIGS. 5 to 9(B). Since the stress measurement device 22 and the stress measurement device 76 shown in FIG. 2 have the same device configuration, the stress measurement device of FIG. 5 is represented by the reference numeral 22.

Figure 5:
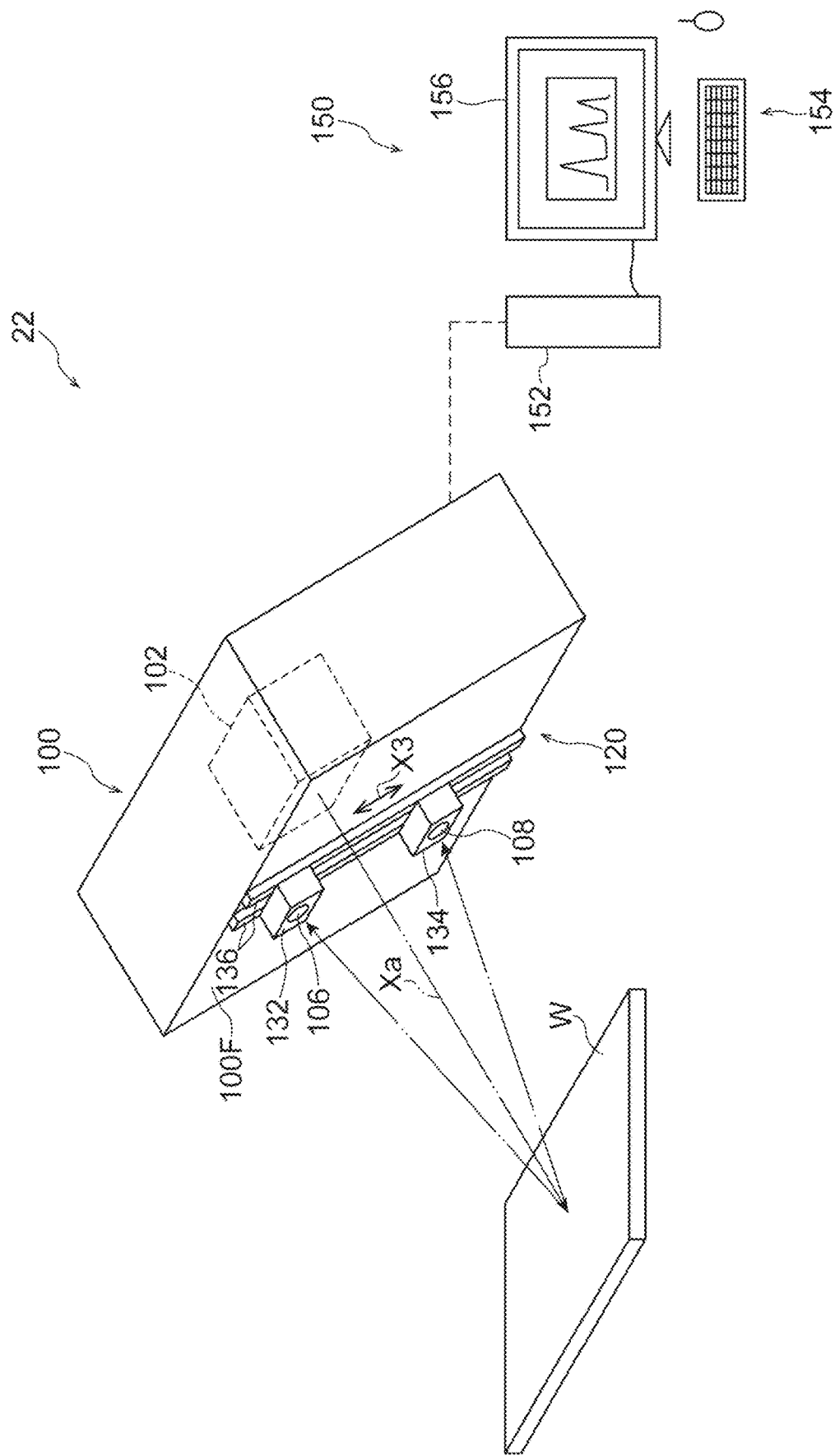
FIG. 5 is a schematic configuration diagram showing a part of a stress measurement device of FIG. 2 as a schematic perspective view.
Figure 6:
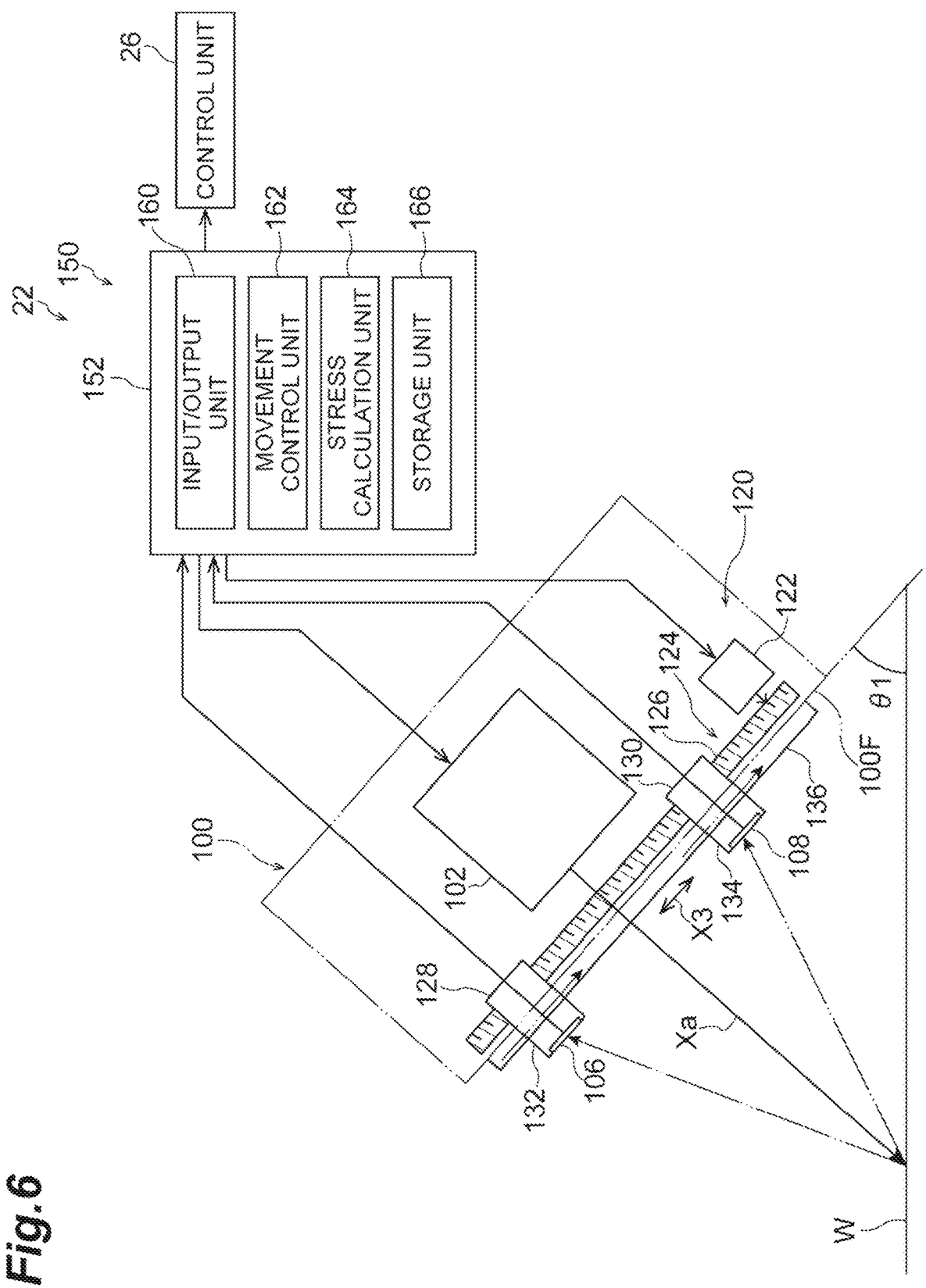
FIG. 6 is a schematic configuration diagram showing a part of the stress measurement device of FIG. 2 as a side view in a simplified state.

FIG. 5 is a schematic perspective view showing a part of the stress measurement device 22. FIG. 6 is a side view simply showing a part of the stress measurement device 22. As shown in FIG. 5, the stress measurement device 22 includes a device body 100 and a control device 150.

The device body 100 is a box-shaped casing. In this embodiment, an X-ray generation source 102 is accommodated inside the device body 100. The X-ray generation source 102 is a device including an X-ray tube and generating X-rays of a predetermined wavelength. In this embodiment, the X-ray generation source 102 is fixed to the device body 100. In the stress measurement device 22, X-rays having an appropriate wavelength are used in accordance with the treatment target W of the inspection target (hereinafter, appropriately referred to as the "inspection target W"). A front surface 100F of the device body 100 is provided with an X-ray irradiation window (not shown). The X-rays which are generated by the X-ray generation source 102 are irradiated to the inspection target W through the window. In FIGS. 5 and 6, a path and an irradiation direction (an incident direction) of the X-ray from the X-ray generation source 102 to the inspection target W are indicated by a line Xa with an arrow.

The device body 100 includes a first detection element 106 and a second detection element 108. Here, the first detection element 106 and the second detection element 108 are disposed on the front surface 100F of the device body 100. Each of the first detection element 106 and the second detection element 108 detects the intensities of the diffracted X-rays of the inspection target W. The first detection element 106 is a zero-dimensional X-ray intensity measurement element. The zero-dimension means the measurement of the intensity of the X-ray at the element arrangement position. That is, the first detection element 106 is different from a one-dimensional line sensor in which a plurality of elements are arranged along a straight line and a two-dimensional imaging plate in which a plurality of elements are arranged in a plane. The second detection element 108 is also a zero-dimensional X-ray intensity measurement element. As the first detection element 106 and the second detection element 108, for example, a scintillation counter is used.

The device body 100 includes a movement mechanism 120 which moves each of the first detection element 106 and the second detection element 108 in a direction (see the direction of the arrow X3) orthogonal to the X-ray incident direction. As shown in FIG. 6, the movement mechanism 120 includes an electric motor 122 for driving a displacement and a ball screw mechanism 124.

The electric motor 122 is fixed to the device body 100. The ball screw mechanism 124 includes a linear screw 126 which extends in a direction (see the direction of the arrow X3) orthogonal to the X-ray incident direction and first and second nuts 128 and 130 threaded into the screw 126. The screw 126 is supported to be rotatable about its axis. When the electric motor 122 is driven, a driving force is transmitted to the screw 126 through a driving force transmission mechanism (not shown) so that the screw rotates about its axis. The screw 126 is disposed at a position offset in the lateral direction (a direction perpendicular to the sheet of FIG. 6) with respect to the X-rays incident from the X-ray generation source 102. A first slider 132 is fixed to the first nut 128. A second slider 134 is fixed to the second nut 130. The first slider 132 and the second slider 134 are supported by a pair of rails 136 (see FIG. 5) to be slidable in the extension direction of the pair of rails 136. The pair of rails 136 is provided on the front surface 100F of the device body 100 and extends in a direction parallel to the screw 126 (a direction orthogonal to the X-ray incident direction). The pair of rails 136 is schematically shown in FIG. 5, but a pair of known guide rails can be used as the pair of rails 136.

As shown in FIG. 6, the first detection element 106 is fixed to the first slider 132. The second detection element 108 is fixed to the second slider 134. When the electric motor 122 is driven, the first nut 128 and the first slider 132 are relatively moved in the axial direction with respect to the screw 126, and the second nut 130 and the second slider 134 are relatively moved in the axial direction with respect to the screw 126. Accordingly, the first detection element 106 and the second detection element 108 are respectively moved in synchronization in a direction (see the direction of the arrow X3) orthogonal to the X-ray incident direction. That is, the first detection element 106 and the second detection element 108 are able to change the X-ray intensity detection position by the movement mechanism 120.

The first detection element 106 detects the intensities of the diffracted X-rays of the inspection target W at a first detection position. The second detection element 108 detects the intensities of the diffracted X-rays of the inspection target W at a second detection position different from the first detection position. The first detection position and the second detection position can be changed in response to, for example, the material of the inspection target W and the focal distance. In this embodiment, the first detection element 106 and the second detection element 108 move in synchronization by the same distance set in advance. The preset distance is a distance in a range in which a necessary diffraction intensity distribution can be obtained.

The movement mechanism 120 is connected to the control device 150 shown in FIG. 5. The control device 150 is configured as, for example, a general-purpose computer including a CPU, a ROM (Read Only Memory), a RAM (Random Access Memory), and a HDD (Hard Disk Drive). The control device 150 includes a processing device 152, an input device 154 (for example, a keyboard and a mouse), and an output device 156 (for example, a display). As shown in FIG. 6, the processing device 152 includes an input/output unit 160, a movement control unit 162, a stress calculation unit 164, and a storage unit 166.

The input/output unit 160 is a communication device such as a network card and an input/output device such as a graphic card. For example, the input/output unit 160 is communicably connected to the electric motor 122. The input/output unit 160 is communicably connected to, for example, the input device 154 and the output device 156 shown in FIG. 5. The input/output unit 160 shown in FIG.

6 is connected to the X-ray generation source 102, the first detection element 106, and the second detection element 108. The movement control unit 162 and the stress calculation unit 164 to be described later exchange information with components via the input/output unit 160.

The movement control unit 162 controls the detection positions of the first detection element 106 and the second detection element 108 by driving the movement mechanism 120 (controlling the driving of the movement mechanism 120). The movement control unit 162 acquires a peak appearance angle determined based on the material forming the inspection target W and controls the detection positions of the first detection element 106 and the second detection element 108 to include the peak appearance angle. The peak appearance position determined based on the material forming the inspection target W is stored in the storage unit 166. The stress calculation unit 164 calculates the residual stress of the inspection target W on the basis of the intensity peak of the diffracted X-rays detected when the first detection element 106 and the second detection element 108 are moved by the movement mechanism 120. Hereinafter, the calculation of the residual stress will be described in detail.

Figure 7:
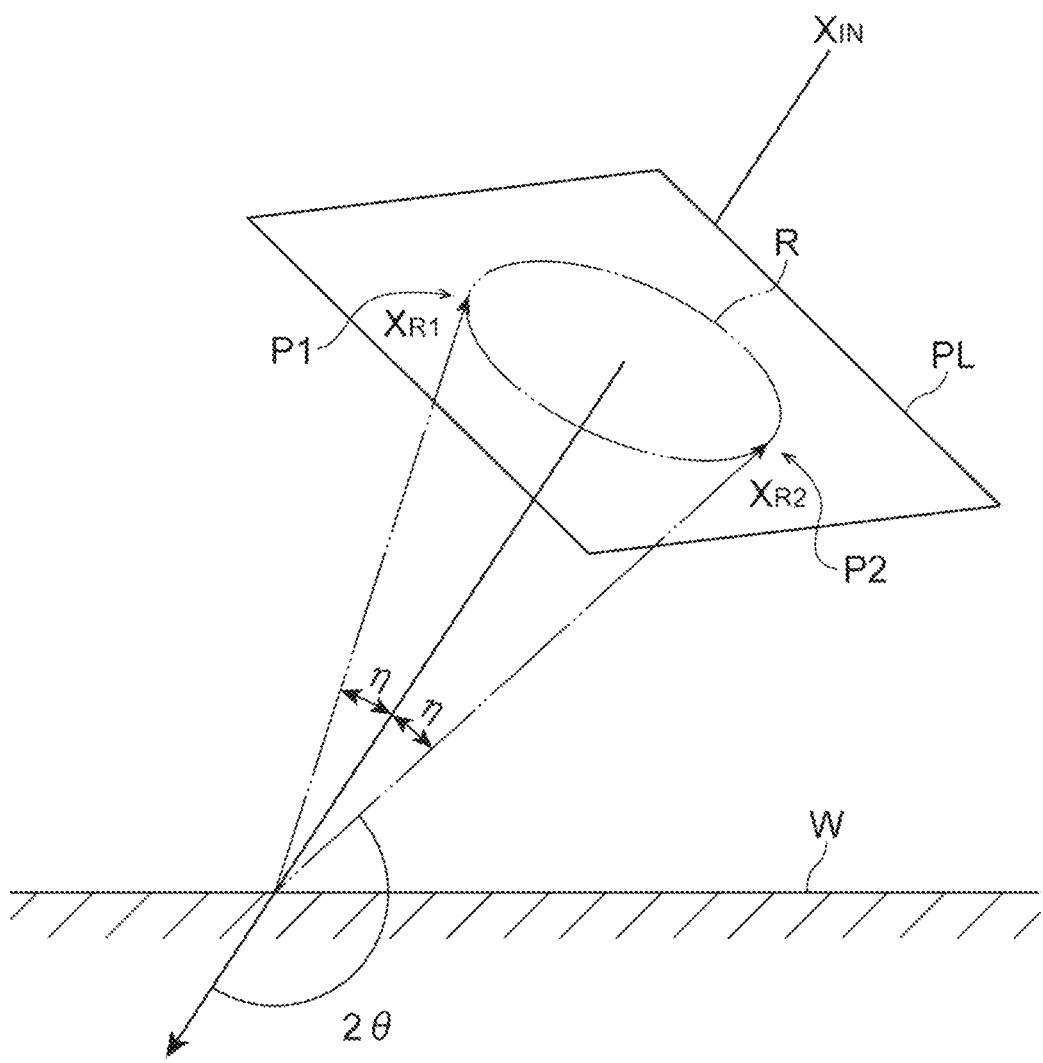
FIG. 7 is a schematic diagram illustrating a detection position of the stress measurement device of FIG. 2.

FIG. 7 is an outline diagram for illustrating a detection position of the stress measurement device 22 according to this embodiment. FIG. 7 shows a case in which incident X-rays XIN are irradiated to the inspection target W and diffracted X-rays are output at a diffraction angle of 2θ. In this case, a diffraction ring R is depicted on a predetermined plane PL by the diffracted X-rays. Here, in this embodiment, for example, an intensity peak appears at each of the detection position corresponding to 0° of the diffraction ring of the diffracted X-rays and the detection position corresponding to 180° of the diffraction ring of the diffracted X-rays. The diffraction intensities of these positions (that is, symmetric points) are acquired.

Figure 8:
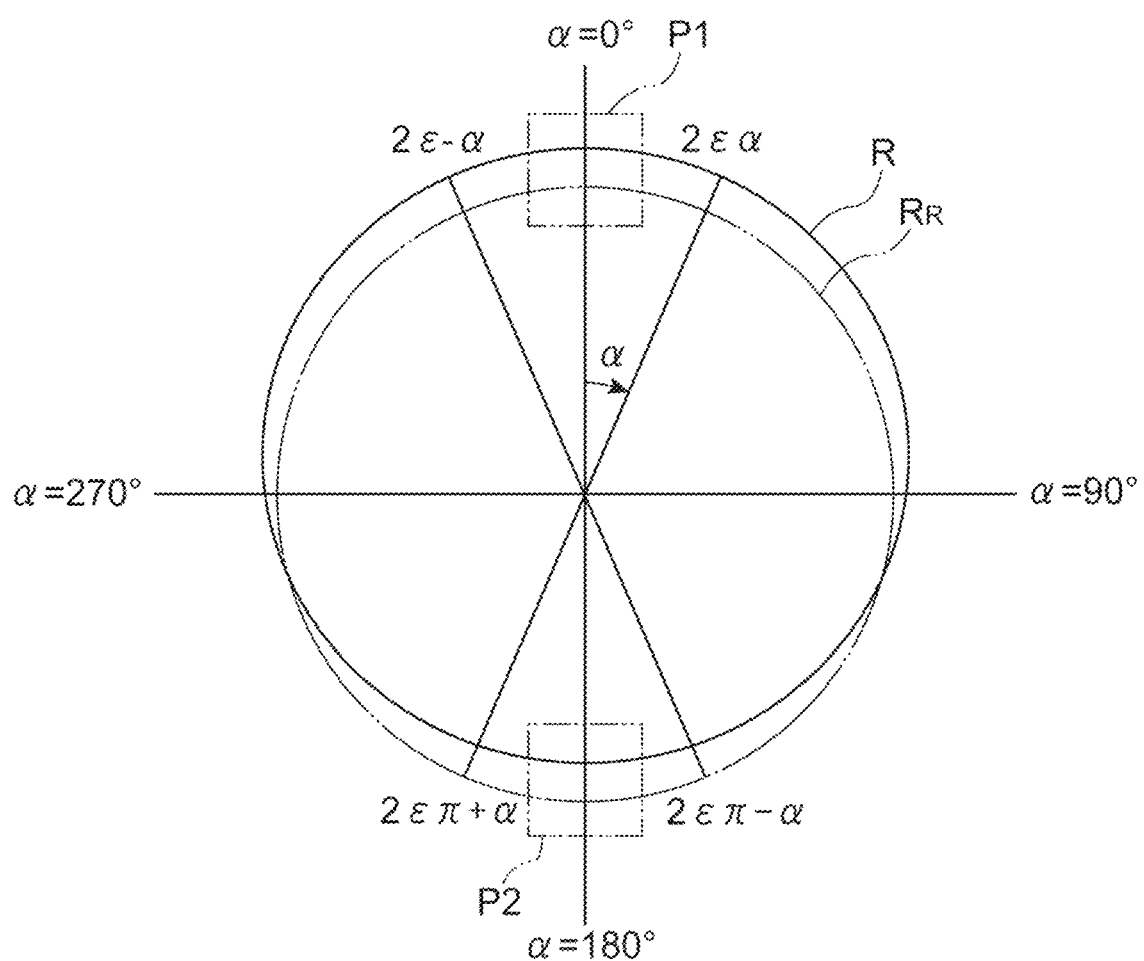
FIG. 8 is a diagram illustrating a diffraction ring depicted by diffracted X-rays.

FIG. 8 is an outline diagram for illustrating the diffraction ring. As shown in FIGS. 7 and 8, diffracted X-rays $X_{R1}$ are detected at a first detection position P1 corresponding to 0° of the diffraction ring R. Diffracted X-rays $X_{R2}$ are detected at a second detection position P2 corresponding to 180° of the diffraction ring R. In this case, the movement control unit 162 (see FIG. 6) sets a range including the first detection position P1 corresponding to 0° of the diffraction ring R so that the first detection element 106 (see FIG. 6) moves in the range. Similarly, the movement control unit 162 (see FIG. 6) sets a range including the second detection position P2 corresponding to 180° of the diffraction ring R so that the second detection element 108 (see FIG. 6) moves in the range. Accordingly, it is possible to obtain two the X-ray diffraction intensity distributions by obtaining two angle diffracted X-rays with one X-ray irradiation.

The stress calculation unit 164 (see FIG. 6) acquires the diffraction peak on the basis of the X-ray diffraction intensity distribution (a relationship between the angle and the intensity) detected at each of the first detection position P1 and the second detection position P2. Here, it is possible to obtain two intensity peaks including the intensity peak corresponding to 0° of the diffraction ring R and the intensity peak corresponding to 180° of the diffraction ring R. The diffraction ring $R_R$ of the two-dot chain line shown in FIG. 8 is a diffraction ring when no residual stress exists in the inspection target W. In the diffraction ring R with the residual stress, the center position deviates in response to the residual stress compared to the diffraction ring $R_R$ without the residual stress.

The stress calculation unit 164 (see FIG. 6) calculates a residual stress value by using this difference. For example, the stress calculation unit 164 (see FIG. 6) calculates the residual stress value using a cos α method. In the cos α method, the residual stress can be obtained from the gradient of the ε-cos α diagram. The ε-cos α diagram shows a relationship between cos α (α: diffraction center angle) and distortion s expressed by using the distortion ($\varepsilon_\alpha$, $\varepsilon_{\pi+\alpha}$, $\varepsilon_{-\alpha}$, $\varepsilon_{\pi-\alpha}$) at four positions (α, π+α, −α, π−α) on the diffraction ring.

The stress calculation unit 164 (see FIG. 6) calculates the gradient of the ε-cos α diagram (the gradient of linear function) using two points of α=0° and 180°. Then, the stress calculation unit 164 (see FIG. 6) obtains the residual stress by multiplying the gradient of the linear function by the X-ray stress measurement multiplier. The X-ray stress measurement multiplier is a constant determined by Young's modulus, Poisson's ratio, complementary angle of Bragg angle, and X-ray incident angle and is stored in advance in the storage unit 166 shown in FIG. 6. The stress calculation unit 164 outputs a calculated residual stress value to the control unit 26 via the input/output unit 160. The residual stress value calculated by the stress calculation unit 164 may be output to the control unit 26 and stored in the storage unit 166 or may be output to the output device 156 (see FIG. 5).

<Residual Stress Measurement Method by Stress Measurement Device 22>

Next, a residual stress measurement method using the stress measurement device 22 will be described. FIGS. 9(A) and 9(B) are flowcharts showing a residual stress measurement method according to this embodiment.

First, an adjustment process before residual stress measurement is performed. FIG. 9(A) is a flowchart showing the adjustment process before residual stress measurement. As shown in FIG. 9(A), an angle adjustment process (step S240) is first performed. In this process, the angle of the X-rays incident to the inspection target W is adjusted. For example, as shown in FIG. 6, when the device body 100 is tilted to adjust a tilting angle θ1, the angle of the incident X-ray is adjusted. A process of tilting the device body 100 is performed by a separate device (a control unit and an actuator) as an example. An incident angle during measurement is fixed to a predetermined angle (a single angle) by the angle adjustment process (step S240) shown in FIG. 9(A).

Next, a focus adjustment process (step S242) is performed. In this process, a focus of the X-rays incident to the inspection target W is adjusted. For example, when the position of the device body 100 (see FIG. 6) is changed, the focus of the X-rays is adjusted. A process of changing the height and the position is performed by a separate device (a control unit and an actuator) as an example.

When the flowchart shown in FIG. 9(A) ends, the stress measurement device 22 can measure the residual stress on the surface side of the inspection target W. FIG. 9(B) is a flowchart showing a method of measuring the residual stress on the surface side of the inspection target W.

As shown in FIG. 9(B), an X-ray irradiation process (step S250: an X-ray irradiation step) is first performed. In the X-ray irradiation process (step S250), X-rays are irradiated from the X-ray generation source 102 to the inspection target W. Next, a measurement process (step S252: a movement control step) is performed during the X-ray irradiation process (step S250). In the measurement process (step S252), the movement mechanism 120 is driven by the control of the movement control unit 162 to move the first detection element 106 and the second detection element 108 (the movement control step) and two X-ray diffraction intensity distributions are obtained on the basis of the detection results of the first detection element 106 and the second detection element 108 in the moving state. In this step, the movement of the first detection element 106 is synchronized with the movement of the second detection element 108. When the measurement process (step S252) ends, the X-ray irradiation may end.

Next, a residual stress calculation process (step S254: a stress calculation step) is performed. In the residual stress calculation process (step S254), the residual stress of the inspection target W is calculated on the basis of the intensity peaks of the diffracted X-rays respectively detected by the first detection element 106 and the second detection element 108 during the measurement process (step S252: the movement control step). That is, in the residual stress calculation process (step S254), two intensity peaks are acquired on the basis of two X-ray diffraction intensity distributions obtained during the movement by the stress calculation unit 164. Then, the gradient of the ε-cos α diagram is calculated by the stress calculation unit 164 and is multiplied by the X-ray stress measurement multiplier to calculate the residual stress. Finally, the residual stress calculated by the stress calculation unit 164 is output to the control unit 26 (see FIG. 3(A)) (step S256).

The flowchart shown in FIG. 9(B) ends as described above. When the control process shown in FIG. 9(B) is performed, the residual stress can be calculated by using the data obtained by moving the first detection element 106 and the second detection element 108. Then, the calculated residual stress can be output to the control unit 26 (see FIG. 3(A)).

As described above, since the stress measurement device 22 shown in FIG. 6 includes the first detection element 106 which detects the intensities of the diffracted X-rays at the first detection position P1 (see FIG. 7) and the second detection element 108 which detects the intensities of the diffracted X-rays at the second detection position P2 (see FIG. 7) different from the first detection position P1 (see FIG. 7), it is possible to obtain the diffracted X-rays at two angles by one X-ray irradiation (an irradiation at a single angle). Each of the first detection element 106 and the second detection element 108 can acquire the X-ray intensity distribution (the diffraction peak) for each element while moving in a direction orthogonal to the X-ray incident direction. It is possible to calculate the residual stress of the inspection target W by acquiring at least two diffraction peaks. For this reason, it is not necessary to acquire all data of the diffraction ring by rotating the imaging plate. Thus, it is possible to shorten the residual stress measurement time compared to the conventional residual stress measurement device.

The stress measurement device 22 according to this embodiment does not need to include an imaging plate rotating mechanism and a reading mechanism. For this reason, since the stress measurement device 22 is simplified and decreased in weight compared to the residual stress measurement device with such a mechanism, the stress measurement device can be easily provided and assembled to other devices. Since the device configuration of the stress measurement device 22 is simplified, it is possible to decrease the manufacturing cost of the device compared to the known residual stress measurement device.

Since the movement control unit 162 synchronizes the movement of the first detection element 106 and the movement of the second detection element 108, it is possible to shorten the residual stress measurement time compared to a case in which the first detection element 106 and the second detection element 108 are individually controlled.

(Surface Treatment Processing Method by Surface Treatment Processing Device 10)

Next, a surface treatment processing method using the surface treatment processing device 10 shown in FIG. 2 will be described with reference to the flowcharts shown in FIGS. 1(A), 1(B), and 2. The surface treatment processing device 10 includes the magnetic evaluation device 20 shown in FIG. 4(A) and the like, the stress measurement device 22 shown in FIG. 5 and the like, and the shot peening processing device 30 shown in FIG. 3(B) and the like. Heat treatment processing is performed on a treatment target (a product) having a product shape by plastic processing and mechanical processing as an example of the treatment target W to be carried into the surface treatment processing device 10 shown in FIG. 2.

The treatment target W which is carried to the surface treatment processing device 10 shown in FIG. 2 is carried on the carry-in conveyor 12. When the treatment target W reaches the pretreatment inspection zone 14, the treatment target W is disposed on the inspection table 16A by the six-axis robot 18 and is inspected by the magnetic evaluation device 20. Then, the treatment target W is disposed on the inspection table 16B by the six-axis robot 18 and is inspected by the stress measurement device 22.

Figure 2:
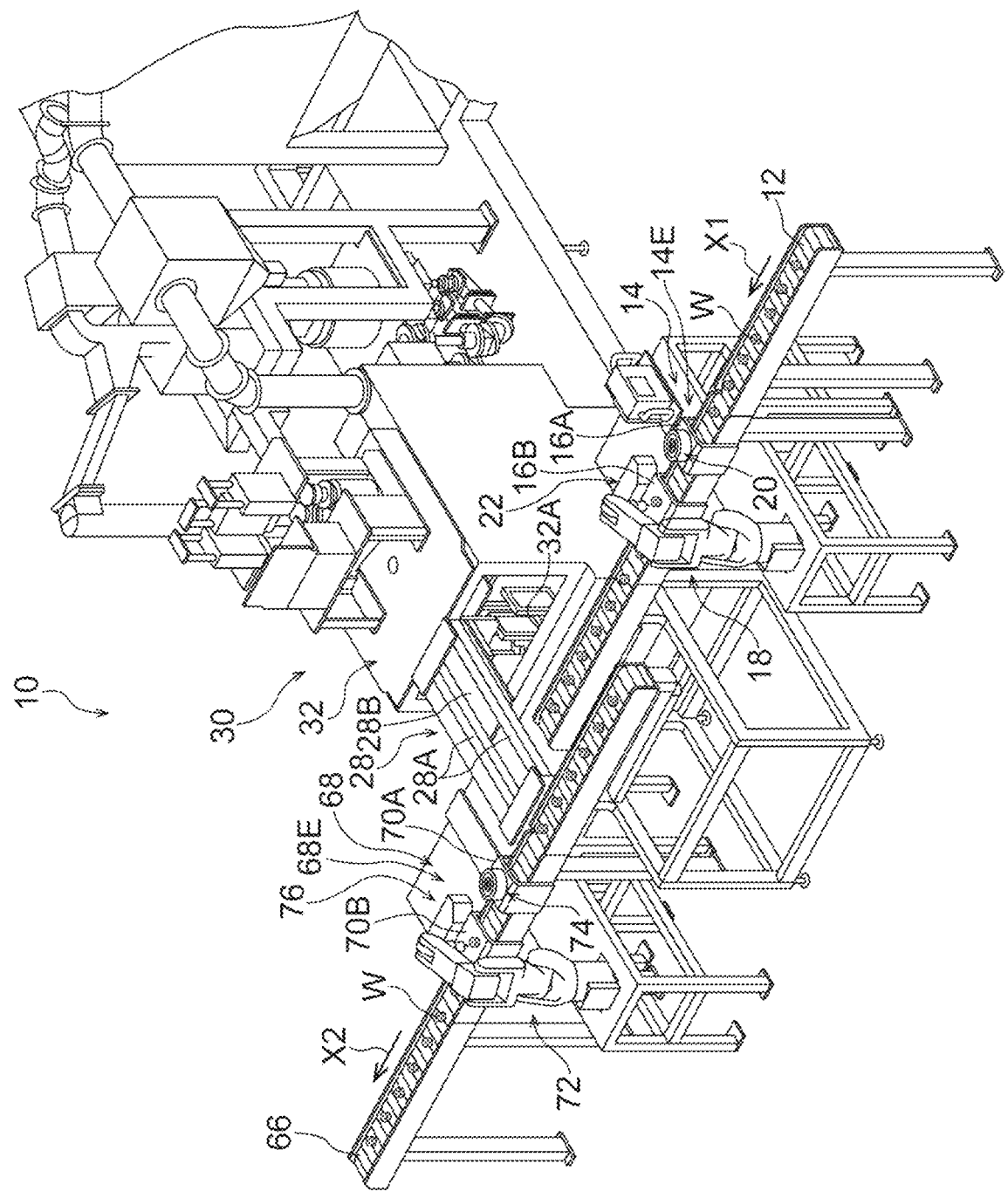
FIG. 2 is a perspective view showing a surface treatment processing device used in a surface treatment processing method according to a first embodiment.

That is, an inspection before the shot processing shown in step S200 of FIG. 1(A), that is, a pretreatment inspection step (a second inspection step) is performed on the inspection tables 16A and 16B. In the pretreatment inspection step, the surface side state of the treatment target W to be subjected to the shot processing for shooting the shot media at the treatment target W is nondestructively inspected. When the inspection result deviates from the second allowable range which is predetermined, it is evaluated that the result is "failed".

First, on the inspection table 16A shown in FIG. 2, the magnetic evaluation device 20 inspects the surface side of the treatment target W by an eddy current. A detailed inspection method is as described above. In the magnetic evaluation device 20, the determination means 96 determines the surface state on the basis of the inspection result. The magnetic evaluation device 20 outputs the inspection result (that is, the evaluation result of the determination means 96) to the control unit 26 (see FIG. 3(A)). Next, on the inspection table 16B, the stress measurement device 22 measures the residual stress on the surface side of the treatment target W by using an X-ray diffraction method. A detailed measurement method is as described above. The stress measurement device 22 outputs the measurement result to the control unit 26 (see FIG. 3(A)). The control unit 26 performs an evaluation of any one of "passed", "conditionally passed", and "failed" on the basis of the inspection results of the magnetic evaluation device 20 and the stress measurement device 22.

In step S202 shown in FIG. 1(A), the control unit 26 determines whether the treatment target W is "failed". A process of the control unit 26 proceeds to step S206 when the determination of step S202 is positive. The process of the control unit 26 proceeds to step S204 when the determination of step S202 is negative. In step S206, the control unit 26 controls the six-axis robot 18 shown in FIG. 2 so that the treatment target W is extracted to the outside of the line of the surface treatment process. The treatment target W which is extracted to the outside of the line is discarded. That is, the treatment target W which is evaluated as "failed" in the pretreatment inspection step is excluded from the shot processing target in advance. Accordingly, unnecessary shot peening processing (defective product processing) is suppressed.

In step S204 shown in FIG. 1(A), the control unit 26 determines whether the treatment target W is "passed". A process of the control unit 26 proceeds to step S210 when the determination of step S204 is negative. The process of the control unit 26 proceeds to step S208 when the determination of step S204 is positive. In step S208 and step S210, the condition setting step is performed. In the condition setting step performed after the pretreatment inspection step, the control unit 26 sets the shot processing condition for the treatment target W which is evaluated as "failed" in the pretreatment inspection step in response to the inspection result of the pretreatment inspection step.

In step S210, the control unit 26 sets a condition (an adjusted condition) obtained by correcting the standard shot processing condition as the shot processing condition for the treatment target W determined as "conditionally passed" (feeds forward) (the condition setting step). That is, the shot processing condition is individually adjusted (for each product) in accordance with the property of the treatment target W (the product) before the individual shot peening processing. Accordingly, the treatment target W which can be a defective product due to the processing in the standard shot processing condition can be manufactured as a good product. Accordingly, it is possible to decrease the treatment target W to be discarded. Accordingly, productivity can be enhanced.

A correction (adjustment) of the shot processing condition for the treatment target W determined as "conditionally passed" will be described in detail. In this embodiment, a condition obtained by correcting the projection pressure for projecting the shot media is set as an example in the shot processing condition. A correction condition (a correction value) of the shot processing condition is calculated as below. First, the arithmetic process device of the control unit 26 reads a program including a calculation equation stored in the storage unit in advance and develops the program in the memory. Next, the program which is developed in the memory is executed by the CPU. Accordingly, the correction condition is calculated. The calculation equation is an equation including the reference value of the shot processing condition. In a modified example, a program including a condition determination may be stored in the arithmetic process device of the control unit 26 in advance and the program may be executed to determine the correction condition for the shot processing condition.

Meanwhile, in step S208, the control unit 26 directly sets the standard shot processing condition as the shot processing condition for the treatment target W determined as "passed". It is possible to perform shot processing in response to the treatment target W by step S210 and step S208.

The treatment target W which is determined as "passed" or "conditionally passed" is moved onto the carry-in conveyor 12 from the inspection table 16B by the six-axis robot 18 shown in FIG. 2. Then, the treatment target W is carried into the cabinet 32 of the shot peening processing device 30 by the carry-in/carry-out loader 28 at the downstream side of the carry-in conveyor 12.

In the cabinet 32 of the shot peening processing device 30, step S212 shown in FIG. 1(A), that is, the shot processing step is performed. In the shot processing step performed after the condition setting step, the projection device 40 of the shot peening processing device 30 shown in FIG. 3(B) performs the shot processing of shooting the shot media at the treatment target W. The shot processing condition in the shot processing step is set by the control unit 26 in the condition setting step for the treatment target W which is evaluated as "not failed" by the control unit 26 in the pretreatment inspection step.

Here, the shot processing will be described. As the shot processing, for example, shot peening (processing) and shot blasting (processing) are known. In such shot processing, for example, roughly spherical shot media (including shots (including abrasive grains)) of several tens of μm to several mm is made to collide with the treatment target W at a high speed. Accordingly, an effect of improving the part surface layer of the treatment target W can be obtained. Shot peening processing is used for the purpose of improving the fatigue strength (durability) of parts subjected to repeated load. Examples of parts subjected to repeated load include automobiles, aircraft, ships, construction machines, processing devices, steel structures, and the like. If the shot peening processing is not properly performed, the surface hardness, the hardness distribution, the compressive residual stress, and the like which need to be obtained are not applied to the parts and the parts may be destroyed at an early stage. Thus, it is necessary to carry out shot peening processing with adequate control in order to maintain proper processing. The shot blasting process is used to secure, for example, removal of deposits on a surface such as rust and scale, adjustment of a surface shape such as surface roughness, improvement of adhesion such as coating and coating film, or an appropriate wear coefficient in a frictional coupling part for the same processed product. Thus, it is necessary to perform shot blasting processing after adequate control similarly to shot peening processing. The shot processing of this embodiment is shot peening processing.

The treatment target W subjected to the shot processing is carried to the upstream side of the carry-out conveyor 66 from the inside of the cabinet 32 of the shot peening processing device 30 by the carry-in/carry-out loader 28 shown in FIG. 2. The treatment target W is carried by the carry-out conveyor 66. When the treatment target W reaches the aftertreatment inspection zone 68, the treatment target W is disposed on the inspection table 70A by the six-axis robot 72 and is inspected by the magnetic evaluation device 74. Then, the treatment target W is disposed on the inspection table 70B by the six-axis robot 72 and is inspected by the stress measurement device 76.

That is, on the inspection tables 70A and 70B, an inspection after the shot processing shown in step S214 of FIG. 1(A), that is, the aftertreatment inspection step (the first inspection step) is performed. In the aftertreatment inspection step after the shot processing step, a surface side state of the treatment target W is nondestructively inspected. An evaluation of "passed" is performed when the inspection result is within the first normal range set in advance, an evaluation of "failed" is performed when the inspection result is out of the first allowable range set in advance, and an evaluation of "to be additionally processed" is performed when the inspection result is out of the first normal range but is within the first allowable range.

On the inspection table 70A shown in FIG. 2, the magnetic evaluation device 74 performs an inspection of performing a magnetic evaluation on the surface side of the treatment target W by eddy currents. A detailed inspection method is the same as the description above. In the magnetic evaluation device 74, the determination means 96 determines whether a surface state is good or bad on the basis of the inspection result. The magnetic evaluation device 74 outputs the inspection result (that is, the evaluation result of the determination means 96) to the control unit 26 (see FIG.

3(A)). Next, on the inspection table 70B, the stress measurement device 76 measures residual stress on the surface side of the treatment target W by using an X-ray diffraction method. A detailed measurement method is the same as the description above. The stress measurement device 76 outputs the measurement result to the control unit 26 (see FIG. 3(A)). As described above, the control unit 26 performs an evaluation of any one of "passed", "failed", and "to be additionally processed" on the basis of the inspection results of the magnetic evaluation device 74 and the stress measurement device 76.

Further, in step S216 after step S214 shown in FIG. 1(A), the control unit 26 stores the inspection result of the stress measurement device 76 (the measurement value) in the storage device. In step S218 after step S216, the control unit 26 determines whether the treatment target W is "failed" (that is, the inspection result of the aftertreatment inspection step is within the first allowable range). The process of the control unit 26 proceeds to step S222 when the determination of step S218 is positive and proceeds to step S219 when the determination of step S218 is negative.

In step S219, the control unit 26 determines whether the treatment target W is "passed" (that is, whether the inspection result of the aftertreatment inspection step is within the first normal range). When the determination of step S219 is positive, the process of the control unit 26 proceeds to step S220. When the determination of step S219 is negative, the control unit 26 determines that the treatment target W is "to be additionally processed". Then, the process of the control unit 26 proceeds to step S208. In step S208, a condition setting step is performed. In the condition setting step which is performed after the aftertreatment inspection step, the control unit 26 sets a standard shot processing condition as the shot processing condition for the treatment target W which is evaluated as "to be additionally processed" in the aftertreatment inspection step.

The treatment target W which is determined as "to be additionally processed" is conveyed from the inspection table 70B to the shot peening processing device 30 by the six-axis robot 72 and the carry-in/carry-out loader 28. In the shot peening processing device 30, step S212, that is, a shot processing step is performed. Here, the shot processing is performed in the shot processing condition which is set by the condition setting step of step S208. Accordingly, an additional processing step is performed for the treatment target W which is determined as "to be additionally processed". Additionally, a condition obtained by correcting the standard shot processing condition may be set as the shot processing condition of the treatment target W which is determined as "to be additionally processed" (feed forward). That is, when the determination of step S219 is negative, the process of the control unit 26 may proceed to step S210. In this case, the shot processing condition is individually adjusted in response to the properties of the treatment target W before the individual reshot peening processing. For this reason, the treatment target W which can be a defective product by the reshot processing in the standard shot processing condition can be a non-defective product. Accordingly, since it is possible to decrease the number of the treatment targets W to be discarded, productivity can be improved. Since the detail of the correction (adjustment) of the shot processing condition for the treatment target W which is determined as "to be additionally processed" is the same as the case of the treatment target W which is determined as "conditionally passed", a description thereof will be omitted.

In step S222, the control unit 26 controls the six-axis robot 72 shown in FIG. 2 so that the treatment target W is extracted to the outside of the line of the surface treatment step. The treatment target W which is extracted to the outside of the line is discarded. The treatment target W which is determined as "passed" is moved onto the carry-out conveyor 66 from the inspection table 70B by the six-axis robot 72. Then, the treatment target W is carried by the carry-out conveyor 66 to be sent to the subsequent step. That is, step S220 shown in FIG. 1(A) is performed.

In this way, according to this embodiment, the actual treatment target W is inspected instead of the test sample in the aftertreatment inspection step performed after the shot processing step. Accordingly, it is possible to directly determine whether a shot peening effect (an effect of shot processing) is given to the treatment target W. Then, it is possible to prevent the incomplete treatment target. W from flowing to the step after the step performed in the surface treatment processing device 10. In this embodiment, the pretreatment inspection step is provided before the shot processing step. For this reason, it is possible to selectively remove the treatment target W which is not suitable for shot peening processing (that is, the treatment target which cannot have the shot peening effect even after shot peening processing) before the shot processing step. Accordingly, it is possible to prevent a defective product from occurring or to suppress a defective product effectively in the shot processing step.

Next, a process of resetting the reference value (the standard setting reference value) of the shot processing condition, that is, a reference value resetting step will be described with reference to FIG. 1(B). As an example, this process is performed when the control unit 26 is activated before processing starts everyday.

Figure 1B:
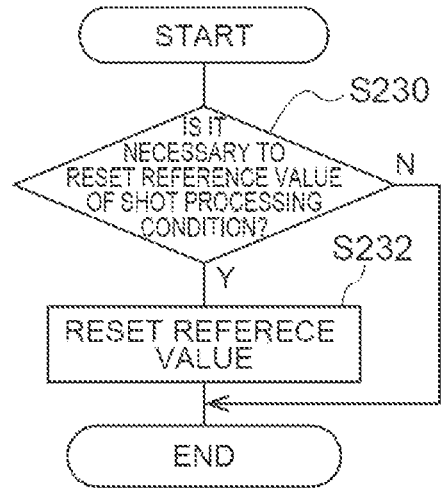

First, in step S230 shown in FIG. 1(B), the control unit 26 determines whether the reference value of the shot processing condition needs to be set again. In the embodiment, as an example, the control unit 26 first predicts a date (in a broad sense, a period) when the average stress value deviates from the first normal stress range (the first normal range for stress) set in advance as a predicted date on the basis of the tendency of a daily change of the average stress value (in a broad sense, a "change with time"). Next, the control unit 26 determines whether the time of execution of step S230 is after the date set in advance for the predicted date by a predetermined number of days (for example, three days). Additionally, since the method of calculating the predicted date is described above, a description thereof will be omitted. The process of the control unit 26 ends when the determination of step S230 shown in FIG. 1(B) is negative and proceeds to step S232 when the determination of step S230 is positive.

In the reference value resetting step of step S232 shown in FIG. 1(B), the control unit 26 resets the reference value of the shot processing condition so as to suppress a ratio in which an evaluation of "passed" is not performed in the aftertreatment inspection step (a ratio in which the inspection result of the aftertreatment inspection unit 68E is out of the first normal range) on the basis of the tendency of a change with time of the inspection result of the stress measurement device 76 in the aftertreatment inspection step. That is, in the reference value resetting step, the inspection result of the aftertreatment inspection step is fed back to the reference value of the shot processing condition. The reference value resetting step is performed before the predicted date on the basis of the tendency of a daily change of the average stress value. Accordingly, it is possible to effectively increase the number of the treatment targets W evaluated as "passed" in the aftertreatment inspection step. Since the method of calculating the predicted date is described above, a description thereof will be omitted. In the reference value resetting step of the embodiment, a reference value of an injection pressure at the time of injecting shot media as an example of the shot processing condition is reset by the control unit 26.

Accordingly, it is possible to perform a correction in response to a mid/long-term change of the shot peening processing device 30 including the projection device 40 shown in FIG. 3(B) and the like, that is, a change in particle diameters of the shot media, a change in shape of a mechanism (a nozzle or the like) for accelerating the shot media, and a change in property of the compressed air supplied from the compressor. Accordingly, it is possible to effectively suppress the ratio of "failed" in the aftertreatment inspection step at the next time. Thus, it is possible to suppress unnecessary shot peening processing.

As described above, according to the surface treatment processing method and the surface treatment processing device 10 (see FIG. 2) of this embodiment, it is possible to manage the processing degree of all treatment targets W subjected to shot processing while suppressing unnecessary shot processing.

Here, the functions and effects of the above-described embodiment will be further described. As a method of quality control in shot peening processing, a device operation management and a product management are known. In the device operation management, the operation state of the processing device is monitored. In the device operation management, parameters (specifically, the projection pressure of the air nozzle type shot peening processing device and a rotation speed of a shooting impeller of the centrifugal shooting device) relating to the speed of the shot media, the flow rate of the shot media, the processing time, and the rotation speed and the rotation state of the treatment target W (the product) on the rotation table are monitored. In the device operation management, the shot peening processing step is guaranteed by operating the processing device while these parameters are within a specified value. In contrast, in the product management, the compressive residual stress, the hardness, and the surface roughness which are shot peening effect indexes are measured for the actually processed product. There is known a method of measuring the processing degree by the shot peening processing device according to an Almen method as an intermediate role between the device operation management and the product management. The method according to the Almen method is a method of measuring a bent state using a test sample and can measure the reproducibility of the processing degree of the device. However, in the method according to the Almen method, it is impossible to control the processing degree to the actual product.

Incidentally, in the device operation management, only the operation state of the device is monitored. For this reason, it is not possible to determine whether a shot peening effect is given to the processed product. Most of the treatment targets W (products) to be brought into the shot peening step are subjected to a heat treatment or the like to be in a state that a sufficient effect can be obtained by shot peening processing. However, since a metal structure is not suitable due to the trouble of the heat treatment state, there is a possibility that the treatment target W (the product) which is not proper due to unsatisfactory surface hardness or hardness distribution may be input. Also the product subjected to satisfactory processing in the device operation management may not be suitable as a passed product. Meanwhile, in the product management, the shot peening effect is given to the surface and a range of several tens of μm to several hundreds of μm from the surface. For this reason, the product management often involves a destructive inspection that scratches and measures the inside of a product. Further, since it takes a measurement time, only a part of a processing lot is generally inspected.

In contrast, in the surface treatment processing method according to the embodiment, all treatment targets W are inspected. Accordingly, it is possible to manage the degree of the processing of all treatment targets W subjected to the shot processing. As described above, there is a case in which a desired effect is not imparted to the treatment target W due to the insufficient shot processing. In such a case, there is a possibility that a desired effect is imparted to the treatment target W by the reshot processing. However, when the reshot processing is also performed on all the treatment target W not having a desired effect due to the reasons other than the insufficient shot processing, productivity declines. According to the embodiment, the surface side state of the treatment target W subjected to the shot processing is nondestructively inspected and the treatment target W having a possibility of having a desired effect by the reshot processing is regarded as "to be additionally processed". Accordingly, it is possible to increase the number of the treatment targets W having a desired effect while suppressing useless shot processing. Thus, productivity can be improved.

Second Embodiment

Next, a surface treatment processing method according to a second embodiment will be described with reference to FIG. 2. A treatment target W according to this embodiment is a thin product such as a leaf spring and a disc spring. A configuration of a surface treatment processing device according to this embodiment is substantially the same as the surface treatment processing device 10 of the first embodiment shown in FIG. 2, but is different from the configuration of the surface treatment processing device 10 of the first embodiment in that a non-contact laser displacement meter (not shown) is disposed instead of the magnetic evaluation devices 20 and 74 and the stress measurement device 22 of the pretreatment inspection unit 14E is not disposed. The difference is substantially the same as that of the first embodiment.

The laser displacement meter nondestructively inspects the external dimension of the treatment target W. The thin product is easily deformed by shot peening processing. For this reason, the laser displacement meter is disposed. The laser displacement meter of the pretreatment inspection zone 14 constitutes the pretreatment inspection unit. The laser displacement meter and the stress measurement device 76 of the aftertreatment inspection zone 68 constitute the aftertreatment inspection unit.

In the pretreatment inspection step, the laser displacement meter nondestructively inspects the external dimension of the treatment target W to be subjected to shot processing (measures initial distortion). In the shot processing, the shot media are shot at the treatment target W. The control unit 26 receives the inspection result of the laser displacement meter and evaluates that the treatment target is "failed" when the inspection result deviates from the second allowable range (the second allowable displacement range) set in advance. In the condition setting step after the pretreatment inspection step, the control unit 26 sets the shot processing condition in response to the inspection result in the pretreatment inspection step for the treatment target W which is evaluated as "not failed" in the pretreatment inspection step. Specifically, the control unit 26 controls the deformation amount by increasing and decreasing the processing time in the shot processing condition on the basis of a difference between a target shape and an initial distortion amount. The control unit 26 sets the shot processing condition so that the shape of the treatment target W subjected to shot peening processing becomes similar to the target shape. In the shot processing step after the pretreatment inspection step, similarly to the first embodiment, the shot processing of shooting the shot media at the treatment target W is performed in the shot processing condition set for the treatment target W, which is evaluated as "not failed" in the pretreatment inspection step, in the condition setting step.

In the aftertreatment inspection step after the shot processing step, the laser displacement meter and the stress measurement device 76 nondestructively inspects the surface side state and the external dimension of the treatment target W. The control unit 26 receives the inspection result and evaluates that the treatment target is "passed" when the inspection result is within a first normal range (a first normal displacement range for displacement and a first normal stress range for stress) set in advance. That is, in the aftertreatment inspection step, the distortion after the processing is measured by the laser displacement meter in order to determine whether the shape after the shot peening processing is appropriate. At the same time, the stress measurement device 76 measures residual stress on a surface side of the treatment target W by using an X-ray diffraction method. The control unit 26 (see FIG. 3(A)) performs an evaluation of any one of "passed", "failed", and "to be additionally processed" on the basis of the inspection result of the laser displacement meter and the stress measurement device 76. Specifically, the control unit 26 (see FIG. 3(A)) evaluates (determines) that the treatment target is "passed" when the inspection results of the laser displacement meter and the stress measurement device 76 are within a first normal range set in advance. The control unit 26 evaluates (determines) that the treatment target is "failed" when at least one of the inspection result of the laser displacement meter and the inspection result of the stress measurement device 76 is out of a first allowable range (a first allowable displacement range for displacement and a first allowable stress range for stress) set in advance. The control unit 26 evaluates (determines) that the treatment target is "to be additionally processed" in other cases.

In the reference value resetting step, similarly to the first embodiment, the reference value of the shot processing condition is reset so as to suppress a ratio in which the treatment target is not evaluated as "passed" in the aftertreatment inspection step (a ratio in which the inspection result in the aftertreatment inspection step is out of the first normal range) on the basis of a temporal change in inspection result of the aftertreatment inspection step. Thus, it is possible to increase the number of the treatment targets W evaluated as "passed" in the aftertreatment inspection step. In this embodiment, the reference value (the standard setting reference value) of the shot processing condition reset in the reference value resetting step is a reference value for processing time.

Also in this embodiment, it is possible to obtain the same functions and effects as that of the above-described first embodiment.

The outer diameter dimension of the treatment target W may be measured by a contact distance meter such as a micrometer as long as the control dimension for each treatment target W can be measured. In a modified example of this embodiment, the control unit 26 may evaluate that the treatment target W is "failed" when the surface side state and the external dimension of the treatment target W are nondestructively inspected in the pretreatment inspection step and the inspection result is out of the second allowable range which is predetermined. That is, in the pretreatment inspection step, the nondestructive inspection may be performed by, for example, the magnetic evaluation device 20 or the stress measurement device 22 in addition to the laser displacement meter. In another modified example of this embodiment, when only the external dimension of the treatment target W is nondestructively inspected in the aftertreatment inspection step and the inspection result is within the first normal range set in advance, the control unit 26 may evaluate that the treatment target is "passed".

In this embodiment, the stress measurement device 22 of the pretreatment inspection unit 14E shown in FIG. 2 is not disposed and the stress measurement device 76 of the aftertreatment inspection unit 68E is disposed. The stress measurement device 76 of the aftertreatment inspection unit 68E shown in FIG. 2 may not be disposed and the stress measurement device 22 of the pretreatment inspection unit 14E may be disposed.

Additional Description of Embodiments

In the above-described embodiments, the shot peening processing device 30 including the projection device 40 (the air nozzle type shot peening processing device) is used as a shooting unit. As the shooting unit, for example, another shooting unit such as a shot blasting device including a centrifugal shooting device for accelerating and shooting shot media by a centrifugal force generated as an impeller rotates may be used. Since the centrifugal shooting device is a known technology, a detailed description will be omitted. As an example, the centrifugal shooting device includes a control gauge, an impeller including a plurality of blades, and a drive motor rotationally driving the impeller. The control gauge is formed in a cylindrical shape and supplies shot media thereinto. An outer peripheral wall of the control gauge is provided with an opening window which is shot media discharge portion. The plurality of blades are disposed on the outer peripheral side of the control gauge and rotate in the circumferential direction of the control gauge. In the case of such a centrifugal shooting device, for example, when the rotation speed of the drive motor per unit time is controlled, the rotation speed of the impeller per unit time is controlled.

As a modified example of the above-described embodiments, at least one of the pretreatment inspection step and the aftertreatment inspection step may include at least one of an inspection of measuring a color tone of a surface side of the treatment target W corresponding to the inspection target and an inspection of measuring surface roughness of the treatment target W corresponding to the inspection target.

When the inspection of measuring the surface roughness of the treatment target W is performed in at least one of the pretreatment inspection step and the aftertreatment inspection step, a non-contact laser displacement meter using an optical system or the like may be applied in addition to a stylus type surface roughness meter.

When the inspection of measuring the color tone of the surface side of the treatment target W is performed in at least one of the pretreatment inspection step and the aftertreatment inspection step, for example, color of the treatment target W (the product) may be distinguished. A color measurement method disclosed in JIS Z8722 may be applied. In addition, since the treatment target W (the target product) is formed of metal in many cases, an image sensor or a gloss meter measuring the degree of gloss by a measurement method disclosed in JIS Z8741 may be applied.

The inspection device used in the pretreatment inspection step and the aftertreatment inspection step may output a measurement result to an external calculation device and a control device in order to store and calculate the measurement result.

The same inspection item is inspected in the pretreatment inspection step and the aftertreatment inspection step of the first embodiment, but a different inspection item may be inspected as in the pretreatment inspection step and the aftertreatment inspection step of the second embodiment. An inspection item according to the treatment target W (the target product), preceding steps, and the shot processing effect (the shot peening effect) to be obtained may be inspected. In the pretreatment inspection step and the aftertreatment inspection step, a plurality of inspection items may be inspected or one inspection item may be inspected. Various patterns can be applied to a combination of the inspection items. In other words, each of the pretreatment inspection unit and the aftertreatment inspection unit may be provided with a single inspection device or a plurality of inspection devices. Various patterns can be applied to a combination of the inspection devices.

As the control unit 26, a control unit including a calculator such as a PC, a sequencer, and a microcomputer can be applied. The calculator or the like may be provided at the shooting unit (the shot peening processing device 30) or the pretreatment inspection unit 14E.

In the first embodiment, the determination means 96 of the magnetic evaluation devices 20 and 74 determines whether the inspection results of the magnetic evaluation devices 20 and 74 are within the second normal magnetic range or the first normal magnetic range set in advance and outputs the evaluation results to the control unit 26. The disclosure is not limited thereto. For example, the magnetic evaluation devices 20 and 74 may output the inspection results (the voltage values) of the magnetic evaluation devices 20 and 74 to the control unit 26 and the control unit 26 may evaluate (determine) whether the inspection results are within the second normal magnetic range or the first normal magnetic range set in advance.

The stress measurement devices 22 and 76 may include the determination means. In this case, the determination means of the stress measurement devices 22 and 76 may evaluate (determine) the inspection results of the stress measurement devices 22 and 76 and may output the evaluation results to the control unit 26.

Further, the control unit 26 evaluates (determines) that the treatment target is "to be additionally processed" on the basis of the inspection result of the stress measurement device 76, but in the same way, the control unit 26 may evaluate (determine) that the treatment target is "to be additionally processed" on the basis of the inspection result of the magnetic evaluation device 74. In this case, the control unit 26 evaluates that the treatment target is "passed" when the inspection result of the magnetic evaluation device 74 is within the first normal magnetic range and the inspection result of the stress measurement device 76 is within the first normal stress range. Further, the control unit 26 evaluates (determines) that the treatment target is "to be additionally processed" when the inspection result of the magnetic evaluation device 74 is out of the first normal magnetic range and is within the first allowable magnetic range and the inspection result of the stress measurement device 76 is within the first normal stress range. The control unit 26 evaluates (determines) that the treatment target is "failed" when the inspection result of the magnetic evaluation device 74 is out of the first allowable magnetic range or the inspection result of the stress measurement device 76 is out of the first allowable stress range.

Further, the control unit 26 may evaluate (determine) that the treatment target is "to be additionally processed" on the basis of the inspection result of both of the magnetic evaluation device 74 and the stress measurement device 76. In this case, the control unit 26 evaluates that the treatment target is "passed" when the inspection result of the magnetic evaluation device 74 is within the first normal magnetic range and the inspection result of the stress measurement device 76 is within the first normal stress range. The control unit 26 evaluates that the treatment target is "to be additionally processed" when the inspection result of the magnetic evaluation device 74 is within the first normal magnetic range and the inspection result of the stress measurement device 76 is out of the first normal stress range but is within the first allowable stress range. Further, the control unit 26 evaluates that the treatment target is "to be additionally processed" when the inspection result of the magnetic evaluation device 74 is out of the first normal magnetic range but is within the first allowable magnetic range and the inspection result of the stress measurement device 76 is within the first normal stress range. Further, the control unit 26 evaluates that the treatment target is "to be additionally processed" also when the inspection result of the magnetic evaluation device 74 is out of the first normal magnetic range but is within the first allowable magnetic range and the inspection result of the stress measurement device 76 is out of the first normal stress range but is within the first allowable stress range. The control unit 26 evaluates that the treatment target is "failed" when the inspection result of the magnetic evaluation device 74 is out of the first allowable magnetic range or the inspection result of the stress measurement device 76 is out of the first allowable stress range.

The control unit 26 can evaluate (determine) that the treatment target W is "conditionally passed", that is, whether the processing is available by changing the shot processing condition on the basis of the inspection result of the stress measurement device 22. Similarly, the control unit 26 can evaluate (determine) that the treatment target W is "conditionally passed" on the basis of the inspection result of the magnetic evaluation device 20. In this case, the control unit 26 evaluates that the treatment target W is "passed" when the inspection result of the magnetic evaluation device 20 is within the second normal magnetic range and the inspection result of the stress measurement device 22 is within the second normal stress range. The control unit 26 evaluates (determines) that the treatment target W is "conditionally passed" when the inspection result of the magnetic evaluation device 20 is within the second allowable magnetic range deviating from the second normal magnetic range and the inspection result of the stress measurement device 22 is within the second normal stress range. The control unit 26 evaluates (determines) whether the inspection result is "failed" when the inspection result of the magnetic evaluation device 20 is out of the second allowable magnetic range or the inspection result of the stress measurement device 22 is out of the second normal magnetic range.

The control unit 26 can evaluate (determine) that the treatment target W is "conditionally passed" on the basis of both inspection results of the magnetic evaluation device 20 and the stress measurement device 22. In this case, the control unit 26 evaluates that the treatment target W is "passed" when the inspection result of the magnetic evaluation device 20 is within the second normal magnetic range and the inspection result of the stress measurement device 22 is within the second normal stress range. The control unit 26 evaluates that the treatment target W is "conditionally passed" when the inspection result of the magnetic evaluation device 20 is within the second normal magnetic range and the inspection result of the stress measurement device 22 is out of the second normal stress range, but is within the second allowable stress range. The control unit 26 evaluates that the treatment target W is "conditionally passed" when the inspection result of the magnetic evaluation device 20 is out of the second normal magnetic range, but is within the second allowable magnetic range and the inspection result of the stress measurement device 22 is within the second normal stress range. The control unit 26 evaluates that the treatment target W is "conditionally passed" when the inspection result of the magnetic evaluation device 20 is out of the second normal magnetic range, but is within the second allowable magnetic range and the inspection result of the stress measurement device 22 is out of the second normal stress range, but is within the second allowable stress range. The control unit 26 evaluates that the treatment target W is "failed" when the inspection result of the magnetic evaluation device 20 is out of the second allowable magnetic range or the inspection result of the stress measurement device 22 is out of the second allowable stress range.

The control unit 26 sets (feeds forward) a condition (an adjusted condition) obtained by correcting the standard shot processing condition as the shot processing condition for the treatment target W determined as "conditionally passed". Accordingly, it is possible to decrease the number of the treatment targets W to be discarded. More specifically, shot media are projected in the shot processing condition obtained by correcting the standard shot processing condition so that, for example, the projection pressure (the shooting pressure) increases for the treatment target W of which the inspection result in the magnetic evaluation device 20 is slightly smaller than the second normal magnetic range in the treatment targets W of the inspection targets determined as "conditionally passed". In contrast, shot media are projected in the shot processing condition obtained by correcting the standard shot processing condition so that, for example, the projection pressure (the shooting pressure) decreases for the treatment target W of which the inspection result of the magnetic evaluation device 20 is slightly larger than the second normal magnetic range in the treatment targets W of the inspection targets determined as "conditionally passed".

For example, at least one of a shot media projection volume per unit time, a shot media projection speed, and a relative shooting position for the treatment target W may be corrected other than the projection pressure for projecting the shot media and the processing time in the shot processing condition for the treatment target W determined as "conditionally passed" in the pretreatment inspection step. In the case of the centrifugal shooting device which accelerates and shoots shot media with a rotation of the impeller, the rotation speed of the impeller per unit time may be corrected and set. When the shot media projection speed cannot be directly changed, it is possible to change a parameter closely relating to the projection speed instead of changing the projection speed. As such a parameter, the projection pressure of the air nozzle type shot peening processing device and the rotation speed of the impeller per unit time of the centrifugal shooting device are exemplified. The relative shooting position for the treatment target W can be changed depending on the movement range of the air nozzle, the movement amount of the treatment target W (the processing product), or the rotation amount of the rotation table (the revolving table, the spinning table) on which the treatment target W is disposed.

As a modified example of the above-described embodiments, the failed treatment target W (the product) evaluated may be discarded by evaluating the treatment target in two stages of "passed" and "failed" on the basis of the inspection result of the pretreatment inspection step. That is, the control unit 26 does not distinguish the states of "conditionally passed" and "passed". The control unit 26 determines that the treatment target W is "passed" when the inspection result of the pretreatment inspection step is within the second allowable range and determines that the inspection result is "failed" when the inspection result is out of the second allowable range. In this case, in the condition setting step, the control unit 26 may set the shot processing condition in response to the inspection result of the pretreatment inspection step instead of uniformly setting the reference value of the shot processing condition for the treatment target W evaluated as "passed".

In the above-described embodiments, the treatment target W evaluated as "failed" in the pretreatment inspection step is discarded, but the treatment target W evaluated as "failed" in the pretreatment inspection step may be reused or may not be discarded as long as it does not flow to the shot processing step. In the case of reusing the treatment target W, the treatment target W evaluated as "failed" may be reused as a treatment target for another purpose, or may be carried into the same surface treatment processing device 10 again to be processed after a process to correct the treatment target W in a separate step and.

In the above-described embodiments, the treatment target W evaluated as "failed" in the pretreatment inspection step is discarded immediately after the determination as "failed" and only the treatment target W evaluated as "passed" or "conditionally passed" flows to the next step. For example, the treatment target W evaluated as "passed" and the treatment target W evaluated as "failed" may be carried in a mixed state for the convenience of the configuration of the production line. In this case, the treatment target W evaluated as "failed" may be separately removed and only the treatment target W evaluated as "passed" may be extracted to be subjected to the shot processing.

The reference value of the shot processing condition which is resectable in the reference value resetting step may include at least one of the shot media projection volume per unit time, the shot media projection speed, the projection pressure for projecting the shot media, the rotation speed of the impeller per unit time for accelerating and shooting shot media by the centrifugal force generated by the rotation of the impeller, the processing time, and each reference value of the relative shooting position for the treatment target W. In the reference value resetting step, the reference value can be reset to a higher value or a lower value.

As a modified example of the above-described embodiments, the control unit 26 shown in FIG. 3(A) may calculate an average value per half day instead of the average value per day. In that case, the control unit calculates a date in which the average stress value deviates from the standard stress range (the first normal range for stress, that is, the first normal stress range) on the basis of the tendency of a temporal change of the average stress value which is an average value per half day. Then, in the reference value resetting step, the control unit 26 resets the reference value of the shot processing condition before the predicted date. That is, the "average value for each predetermined period" may be an "average value per day" as in the above-described embodiments, an "average value per half day" as in a modified example of the above-described embodiment, or an average value for every other predetermined period (for example, an average value per week).

As a modified example of the above-described embodiments, the control unit 26 may reset the reference value of the shot processing condition to suppress a ratio in which treatment target W is not evaluated as not "passed" in the aftertreatment inspection step (a ratio in which the inspection result of the aftertreatment inspection unit 68E is out of the first normal range) on the basis of the tendency of a temporal change in inspection result of the magnetic evaluation device 74 in the aftertreatment inspection step instead of the tendency of a temporal change in inspection result of the stress measurement device 76 in the aftertreatment inspection step. That is, the inspection result of the magnetic evaluation device 74 may be fed back to the reference value of the shot processing condition. Both of the magnetic evaluation device 74 and the inspection result of the stress measurement device 76 may be fed back to the reference value of the shot processing condition.

In the above-described embodiments, the stress measurement devices 22 and 76 include the first detection element 106 and the second detection element 108 shown in FIG. 6 and the like, but the stress measurement devices 22 and 76 may include three or more detection elements.

In the stress measurement devices 22 and 76 (see FIG. 2) according to the above-described embodiment, the movement mechanism 120 shown in FIG. 6 includes the single electric motor 122 and the single ball screw mechanism 124 operated by the single electric motor 122 in order to respectively move the first detection element 106 and the second detection element 108, but may include electric motors and ball screw mechanisms respectively corresponding to the first detection element 106 and the second detection element 108. In this case, the control device 150 can control the movements of the first detection element 106 and the second detection element 108 by controlling the electric motors respectively corresponding to the first detection element 106 and the second detection element 108. The control device 150 can synchronize the movements of the first detection element 106 and the second detection element 108 or cannot synchronize the movements by controlling two electric motors.

In the above-described embodiments, the treatment target W to be inspected by the pretreatment inspection step is subjected to a heat treatment, but the treatment target W which is inspected by the pretreatment inspection step may be the treatment target W not subjected to the shot processing or the heat treatment, for example, the treatment target subjected to a nitriding treatment. As a modified example of the above-described embodiments, compressive residual stress may be applied to the surface side of the treatment target W, which has a tensile residual stress at the pretreatment inspection step, due to processing the shot peening in the shot processing step.

Figure 10:
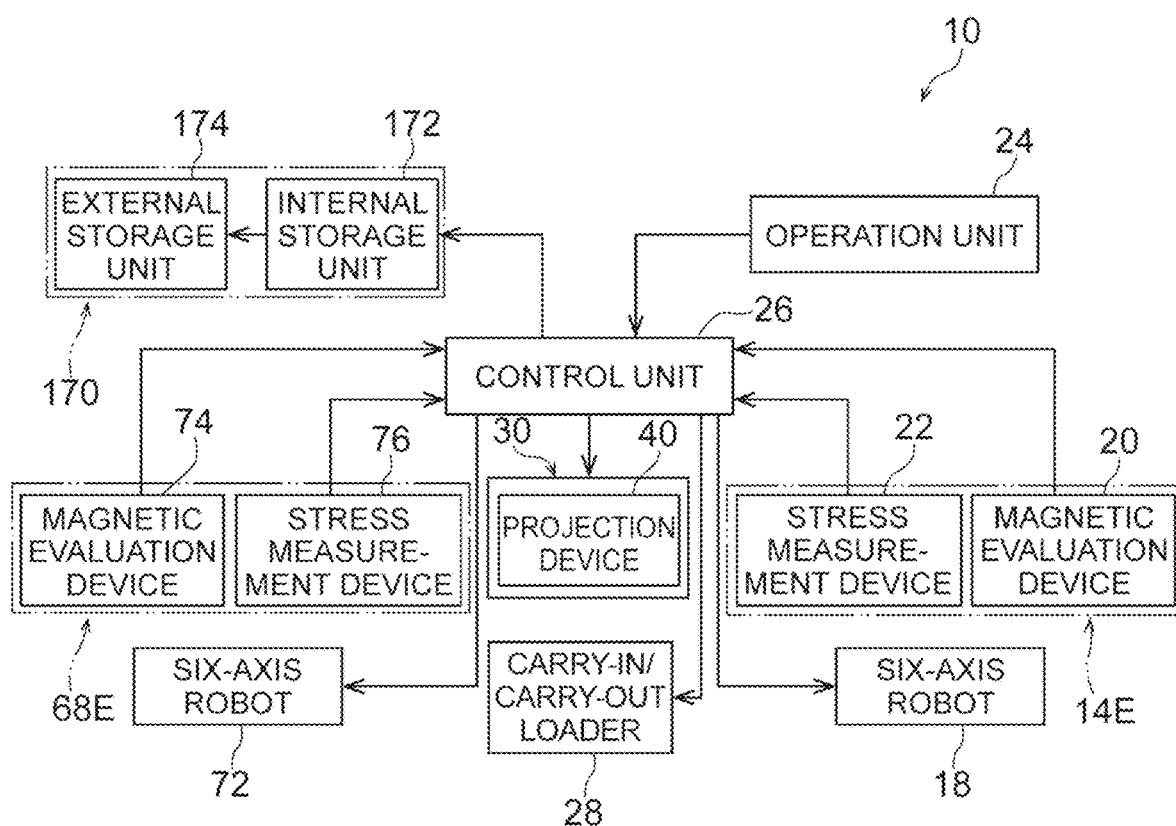
FIG. 10 is a schematic diagram showing a part of a control system of a surface treatment processing device according to a modified example in the form of a block.

As a modified example of the above-described embodiments, as shown in FIG. 10, the surface treatment processing device 10 may further include a storage unit 170. The storage unit 170 includes at least one of the inspection result of the pretreatment inspection unit 14E, the inspection result of the aftertreatment inspection unit 68E, and the shot processing condition as data acquired by the surface treatment processing device 10. The storage unit 170 may store at least one of the inspection result of the pretreatment inspection unit 14E and the inspection result of the aftertreatment inspection unit 68E. Here, the storage unit 170 stores, for example, all of the inspection result of the pretreatment inspection unit 14E, the inspection result of the aftertreatment inspection unit 68E, and the shot processing condition.

The storage unit 170 includes an internal storage unit 172 and an external storage unit 174. The internal storage unit 172 is a storage unit dedicated for the surface treatment processing device 10 and is not shared by other surface treatment processing devices 10. The internal storage unit 172 is, for example, an HDD or a flash memory such as an SD card directly connected to the control unit 26. The external storage unit 174 is a storage unit shared by other surface treatment processing devices 10. The external storage unit 174 may have a configuration which can be shared by other surface treatment processing devices 10 and may not be actually shared by other surface treatment processing devices 10. The external storage unit 174 is a server connected to the control unit 26 via an intranet or an internet line (within a facility such as a factory) or outside (out of a facility such as a factory). The external storage unit 174 can be a server within the surface treatment processing device 10 as long as a configuration which can be shared by other surface treatment processing devices 10 is provided. The server may be a cloud server. The external storage unit 174 can store, for example, data acquired by the surface treatment processing devices 10.

In the surface treatment processing method using the surface treatment processing device 10 shown in FIG. 10, the storage unit 170 stores at least one of the inspection result of the pretreatment inspection step, the inspection result of the aftertreatment inspection step, and the shot processing condition as the data acquired by the surface treatment processing device 10 (the storage step). In the storage step, the storage unit 170 may store at least one of the inspection result of the pretreatment inspection step and the inspection result of the aftertreatment inspection step. By the storage unit 170 and the storage step, utilization of these data is enhanced. For example, it is possible to analyze the data of the tendency of the operation state of the surface treatment processing device 10 or the surface treatment processing devices 10 later.

The data acquired by the surface treatment processing device 10 is temporarily stored in, for example, the internal storage unit 172. Then, the data stored in the internal storage unit 172 is sent to the external storage unit 174 to be stored in the external storage unit 174 every predetermined period (every shot processing or everyday). For this reason, for example, these data can be temporarily stored in the internal storage unit 172 and can be stored in the external storage unit 174 at an arbitrary timing. For example, when the data acquired by the surface treatment processing device 10 is stored for each shot processing as described above, the storage step may be performed as step S217 instead of, for example, step S216 of FIG. 1(A). The inspection result of the pretreatment inspection unit 14E may be stored in the internal storage unit 172 by the pretreatment inspection step of step S200, the inspection result of the aftertreatment inspection unit 68E may be stored in the internal storage unit 172 by the aftertreatment inspection step of step S214, and the shot processing condition may be stored in the internal storage unit 172 by the condition setting step of step S208 or step S210. When these data is stored the server, the data may be stored in the server through a transmission step of transmitting the data to the server. That is, the surface treatment processing method may include a first transmission step of transmitting the inspection result of the pretreatment inspection unit 14E to the server, a second transmission step of transmitting the inspection result of the aftertreatment inspection unit 68E to the server, and a shot processing condition transmission step of transmitting the shot processing condition to the server.

In the condition setting step, the control unit 26 may set the shot processing condition in response to the information received from the server. In the reference value setting step, the control unit 26 may set the reference value in response to the information received from the server. Specifically, when a program read from the storage unit of the arithmetic process device of the control unit 26 is executed, the correction condition for the shot processing condition or the reference value of the shot processing condition is calculated. The control unit 26 can transmit and receive (input and output) information to and from the server by a communication interface unit. The information transmitted by the server may be, for example, the tendency of the operation state of the surface treatment processing device 10 or the surface treatment processing devices 10 obtained by the data analysis. According to these information, the shot processing condition can be optimized.

In addition to the configurations of the above-described embodiments, marking (embossing) for product identification may be performed on the treatment target W by a laser marker before the pretreatment inspection step or before the shot processing step after the pretreatment inspection step. In this case, the control unit 26 may store identification information corresponding to the marking, information of the inspection result of the pretreatment inspection step, and information of the inspection result of the aftertreatment inspection step in the external storage device (the storage unit). Accordingly, it is possible to provide a traceability system that can confirm history information of a finished product using a reader for mark reading. In the surface treatment processing device 10 according to the above-described modified example shown in FIG. 10, the storage unit 170 may store these information (the storage step).

A method of assigning identification information such as an additional number (a back number) to the processing target W is not particularly limited as long as the processing target W can be specified by the identification information. As the assigning method, for example, in addition to the above-described marking, a method of directly writing characters, a method of writing a shape having code information such as a bar code and a two-dimensional code, a method of writing color tone by paint or the like, and a method of attaching and embedding an IC chip or the like having information can be exemplified. As the data stored in the external storage device or the storage unit 170, the operation data of the surface treatment processing device 10 can be exemplified other than the identification information of the treatment target W and the workpiece information data including the inspection result. The workpiece information data may further include, for example, an inspection time, a name (identification information) of the surface treatment processing device 10, and a processing start time. The operation data of the surface treatment processing device 10 includes, for example, a projection pressure (an air pressure), a processing start time, a shot media projection volume (shot projection volume) per unit time, an air flow rate, or a workpiece rotation speed. When the surface treatment processing device 10 includes a plurality of air nozzles, the operation data of the surface treatment processing device 10 includes the operation data for each air nozzle. The storage unit 170 may store these data in another database at, for example, a measurement timing.

The above-described embodiments and modified examples can be appropriately combined with each other.

An example of the disclosure has been described above. The invention is not limited to the description above. In addition to the description above, various modifications can be, of course, made within the scope not departing from the gist of the invention.

REFERENCE SIGNS LIST

10: surface treatment processing device, 14E: pretreatment inspection unit, 20: magnetic evaluation device, 22: stress measurement device, 26: control unit, 30: shot peening processing device (shooting unit), 68E: aftertreatment inspection unit, 74: magnetic evaluation device, 76: stress measurement device, 102: X-ray generation source, 106: first detection element, 108: second detection element, 120: movement mechanism, 162: movement control unit, 164: stress calculation unit, 170: storage unit, W: treatment target.

The invention claimed is:

1. A surface treatment processing method comprising:
   a shot processing step of performing shot processing of shooting shot media at a treatment target;
   a first inspection step of (i) nondestructively inspecting at least one of a surface side state and an external dimension of the treatment target subjected to the shot processing, (ii) determining that the treatment target has passed the inspection when a first inspection result of the first inspection step is within a first normal range set in advance, (iii) determining that the treatment target has failed the inspection when the first inspection result is outside of a first allowable range set in advance and including the first normal range, and (iv) determining that the treatment target is to be additionally processed when the first inspection result is outside of the first normal range but within the first allowable range;
   in response to determining that the treatment target is to be additionally processed, performing the shot processing again on the treatment target; and
   a reference value resetting step of resetting a reference value of a shot processing condition at a predetermined time to suppress a ratio in which the result of the first inspection step is outside of the first normal range at a future time by a predetermined amount based on a calculated tendency of a temporal change in first inspection results averages, the reference value resetting step performed before shot processing starts, the reference value resetting step including calculating average daily values of inspection result data determined during the first inspection step compared to a standard median value of the first normal range, and determining a gradient and an intercept to determine the tendency.

2. The surface treatment processing method according to claim 1, further comprising:
   a storage step of storing the first inspection result of the first inspection step.

3. The surface treatment processing method according to claim 2, further comprising:
   prior to the shot processing step, a second inspection step of nondestructively inspecting at least one of a surface side state and an external dimension of the treatment target to be subjected to the shot processing and determining that the treatment target has failed the inspection when a second inspection result of the second inspection step is outside of a second allowable range set in advance, wherein in the shot processing step, the shot processing is performed on the treatment target determined as having not failed the inspection of the second inspection step.

4. The surface treatment processing method according to claim 1, further comprising:

prior to the shot processing step, a second inspection step of nondestructively inspecting at least one of a surface side state and an external dimension of the treatment target to be subjected to the shot processing and determining that the treatment target has failed the inspection when a second inspection result of the second inspection step is outside of a second allowable range set in advance, wherein in the shot processing step, the shot processing is performed on the treatment target determined as having not failed the inspection of the second inspection step.

5. The surface treatment processing method according to claim 4, further comprising:

after the second inspection step, a condition setting step of setting the shot processing condition in response to the second inspection result of the second inspection step for the treatment target determined as having not failed the inspection in the second inspection step, wherein in the shot processing step, the shot processing is performed in the shot processing condition set in the condition setting step.

6. The surface treatment processing method according to claim 5, wherein in order to inspect a surface side state of the treatment target corresponding to an inspection target, each of the first inspection step and the second inspection step includes at least one of a step of measuring residual stress of a surface side of the treatment target, a step of performing a magnetic evaluation on the surface side of the treatment target by eddy currents, a step of measuring a color tone of the surface side of the treatment target, and a step of measuring surface roughness of the treatment target.

7. The surface treatment processing method according to claim 4, wherein in order to inspect a surface side state of the treatment target corresponding to an inspection target, each of the first inspection step and the second inspection step includes at least one of a step of measuring residual stress of a surface side of the treatment target, a step of performing a magnetic evaluation on the surface side of the treatment target by eddy currents, a step of measuring a color tone of the surface side of the treatment target, and a step of measuring surface roughness of the treatment target.

* * * * *